(12) United States Patent
Minabe et al.

(10) Patent No.: US 7,227,825 B2
(45) Date of Patent: Jun. 5, 2007

(54) SIGNAL RECORDING/REPRODUCING APPARATUS WITH IMPROVED POWER CONSUMPTION

(75) Inventors: Kouji Minabe, Hitachiota (JP); Yukio Nakamura, Mito (JP); Shoji Ohno, Hitachinaka (JP); Ko Kumagai, Hitachinaka (JP); Kenji Sano, Yokohama (JP)

(73) Assignees: Hitachi, Ltd., Tokyo (JP); Hitachi Video & Information System, Inc., Yokohama-shi (JP)

( * ) Notice: Subject to any disclaimer, the term of this patent is extended or adjusted under 35 U.S.C. 154(b) by 557 days.

(21) Appl. No.: 10/755,284

(22) Filed: Jan. 13, 2004

(65) Prior Publication Data
US 2004/0143771 A1 Jul. 22, 2004

Related U.S. Application Data

(63) Continuation of application No. 09/422,352, filed on Oct. 21, 1999, now Pat. No. 6,680,878.

(30) Foreign Application Priority Data
Oct. 21, 1998 (JP) .................................. 10-299310

(51) Int. Cl.
G11B 20/00 (2006.01)

(52) U.S. Cl. ................................... 369/53.45
(58) Field of Classification Search ...................... None
See application file for complete search history.

(56) References Cited

U.S. PATENT DOCUMENTS 5,278,654 A 1/1994 Yang
5,449,238 A 9/1995 Pham et al.
5,602,805 A * 2/1997 Chigita ..................... 369/13.02

FOREIGN PATENT DOCUMENTS

| DK | 1954659 | 6/1997 |
|----|---------|--------|
| JP | 4-44941 | 4/1992 |
| JP | 4-162102 | 6/1992 |
| JP | 8-36870 | 2/1996 |
| JP | 8-83450 | 3/1996 |
| JP | 9-320142 | 12/1997 |

* cited by examiner

Primary Examiner—Paul W. Huber
(74) Attorney, Agent, or Firm—Antonelli, Terry, Stout & Kraus, LLP.

(57) ABSTRACT

A signal recording/reproducing apparatus includes a first power source unit which generates necessary electric power signals from a commercial power source, a second power source unit which generates a necessary electric power signal from a battery, a recording signal processing unit, and a reproduced signal processing unit. The apparatus further includes time measuring instrument which is supplied with the electric power from the second power source unit, and a charging unit which charges the battery with the electric charges. Whenever the time measuring instrument measures a predetermined time, the generation of the electric power signals from the first power source unit is started, and the battery is charged with the electric charges by the charging unit.

4 Claims, 17 Drawing Sheets

SIGNAL RECORDING/REPRODUCING APPARATUS WITH IMPROVED POWER CONSUMPTION

CROSS REFERENCE TO RELATED APPLICATION

This is a continuation of U.S. application Ser. No. 09/442,352, filed Oct. 21, 1999, now U.S. Pat. No. 6,680,878, the subject matter of which is incorporated by reference herein.

BACKGROUND OF THE INVENTION

1. Field of the Invention

The present invention relates in general to a power source circuit (i.e. power supply circuit) for use in an apparatus for recording/reproducing signal, and more particularly to the technology of improving the power consumption while ensuring the convenienceness which is required in the standby state.

2. Description of the Related Art

A conventional apparatus for recording/reproducing data includes principally the following blocks. That is, the apparatus includes: a power source circuit block for generating a D.C. regulated power source voltage (i.e. power supply voltage) from an A.C. commercial power source; a block for carrying out the record and reproduction of data; and a system control block for controlling, in response to an instruction issued from a user, each of the circuit blocks.

Now, in a relatively old apparatus, in order to implement the instruction, to supply the electric power to the apparatus, which instruction has been issued from a user, a mechanical switch, a relay circuit having physical contacts, or the like is inserted into the power source circuit. For this reason, even when the power feed cord of the apparatus is connected to a mains socket of the commercial power source, if a user issues an instruction to stop the supply of the electric power from the power source circuit to the apparatus, the supply of the electric power to the apparatus is substantially interrupted and hence the state of the apparatus proceeds to the state in which no electric power is consumed therein.

On the other hand, in a recent apparatus, there is adopted the method wherein even when the apparatus is in the state in which an instruction to stop the supply of the electric power from the power supply to the apparatus has been issued from a user, an instruction to turn ON the power supply which has been issued from a user is received in the form of the instruction signal from a remote controller, or in order to reduce the cost of the power source switching circuit as described above, a small switch is provided in the position different from that of the power source circuit and the state of the switch is detected to control an electrical switch provided within the power source circuit.

In addition, in a signal recording/reproducing apparatus having a circuit for receiving the broadcasting signal which is provided either within a recording circuit or in a stage before the recording circuit, in order to carry out the reserved picture recording or the sound recording of the broadcasting signals, a clock circuit is provided either in a system controller or in the periphery thereof to automatically control the start and the end of the recording at the reserved time.

Therefore, in the recent data recording/reproducing apparatus, even when the apparatus is in the state in which an instruction to stop the supply of the electric power from the power supply to the apparatus has been issued from a user, the electric power needs to be supplied to at least the system control block. For this reason, in the state in which the power feed cord of the apparatus is connected to a mains socket of the commercial power source, even in the state in which the instruction to stop the supply of the electric power from the power supply to the apparatus has been issued from a user, the apparatus is placed in the state of consuming the electric power (hereinafter, this state is referred to as "the standby state" for short, when applicable).

Now, one might perhaps think that since in the standby state, the electric power does not need to be supplied to the data recording/reproducing block which requires the electric power the most, the load is reduced and hence the power consumption is less. However, since the power source circuit is designed to operate stably even in the case where the load is heaviest, in the case of the light load the efficiency thereof is reduced-so that the power consumption of the power source circuit itself is not decreased so much, or the power consumption of the current circuit itself may be increased in some cases. As a result, it is conventionally difficult to sufficiently reduce the power consumption of the apparatus in the standby state.

Then in order to improve this disadvantage, in a apparatus disclosed in JP-A-9-320142, there was devised the apparatus wherein in addition to the generation of the D.C. power source voltage from the commercial power source, an electric power supplying unit is provided in the form of a battery. This apparatus is designed such that a switch is provided in a power source circuit block, and upon closing of this switch, the electric power is supplied from the battery to a part of the system control block or a part of the peripheral circuits thereof. As a result, since the power consumption in the power source circuit is removed, the power consumption of the apparatus in the standby state is improved.

SUMMARY OF THE INVENTION

In the prior art as described above, however, the following points are not especially taken into consideration. First, the point that there is the possibility that if the time period of the standby state is long, then the battery will have been discharged is not especially taken into consideration. In this case, a new task, such as the task of exchanging an old battery for new one, is required which task is not required for the conventional apparatus in which the electric power is supplied to the power source circuit even in the standby state, and hence there is the possibility that the convenienceness for users is injured.

In addition, in the prior art as described above, a switch for interrupting the electric power signal line from the commercial power source is inserted as a means for interrupting the power source circuit. As well known, the commercial power source has a large driving ability and a large voltage amplitude. For this reason, regardless of whether electrical or mechanical switch is employed, a relatively large switch needs to be employed and also since the attention needs to be sufficiently paid to the safety, the cost involved is not especially taken into consideration.

In addition, the above-mentioned prior art refers, as the destination of the supply of the electric power from the battery in the standby state, to a part of the system control block for carrying out the time management processing and for fetching in the instruction information issued from a user or the peripheral circuits thereof, and the supply of the electric power to the circuit for the time display.

However, units required to operate in the standby state are not limited thereto. For example, in a recent digital broadcasting, subscription sign-up contract information made with a user is superimposed on the broadcasting signal and transmitted. In this case, the enable code of the program for which viewing is permitted can be obtained on the basis of the contract information of interest. Therefore, in terms of the apparatus, the contract information needs to be received previously in the standby state before a user begins to carry out the viewing. In addition, it is assumed that the circuit for the time display is constituted by the liquid crystal circuit for example. In this case, for the purpose of recognizing more readily the display, a light source such as back lights needs to be provided.

As described above, the number of functions which are wanted to be driven even in the standby state is increased with the number of functions which are added to the data recording/reproducing apparatus. In this case, there is the possibility that covering all of the standby state only with the drive by the battery may become expensive in some cases.

In other words, in the above-mentioned prior art, there is adopted the configuration wherein in the standby state, the power source circuit is completely interrupted. However, even in the standby state, the drive by the battery is advantageous in some cases, and the drive by the power source circuit is advantageous in some other cases. Hence, the switch for switching the drive of the apparatus by the battery over to the drive by the power source circuit even when there is no instruction, which has issued from a user, to turn ON the power source is not especially taken into consideration.

In the light of the foregoing, the present invention was made in order to solve the above-mentioned problems associated with the prior art, and it is therefore an object of the present invention to provide a signal recording/reproducing apparatus including an optimal control unit or a switching unit of a power source circuit in the standby state without injuring the conveniceness for users.

In order to solve the above-mentioned problems associated with the prior art, a signal recording/reproducing apparatus according to the present invention is designed in such a way as will be described below.

First, for discharging of the battery when the time period for the standby state is long, the following configuration is adopted. That is, the apparatus includes a circuit for charging a battery with an electric power signal which is generated by a power source circuit (a power supply unit having the commercial power source as a power source thereto), wherein for a time period when a user uses the signal recording/reproducing apparatus, i.e., for a time period when the power source circuit is being operated, the battery is charged with the electric power signal. In addition, the apparatus includes an hour measuring instrument or a time measuring instrument, wherein even when there is provided the standby state whenever a fixed time period has elapsed or it has become a fixed time, the power source circuit is activated to charge the battery with the electric charges.

In addition, as another method of solving the above-mentioned problems associated with the prior art, the following configuration is adopted. That is, a signal recording/reproducing apparatus includes: a circuit for charging the battery with an electric power signal which is generated by the power source circuit; an hour measuring instrument or a time measuring instrument; and a detection unit for detecting a voltage level of the battery whenever a fixed hour or time period has elapsed, wherein when the voltage level thus detected is equal to or lower than a predetermined value, the power source circuit is activated if necessary to charge the battery.

Next, in order to facilitate easy interrupt of the power source circuit, the following configuration is adopted. The power source circuit for generating the D.C. power source voltage from the commercial power source adopts generally the following configuration. That is, the power source circuit includes: a circuit for rectifying an A.C. commercial power source signal; a transformer for coupling the rectified signal to the primary side thereof to obtain a secondary side signal for which the swing level conversion has been made; and a circuit for smoothing the signal which is obtained after completion of the swing level conversion therefor and which appears on the secondary side of the transformer. In the present invention, there is adopted the configuration wherein an electrical switch is provided on the secondary side, particularly in a stage after the smoothing circuit of the above-mentioned power source circuit, and is controlled on the basis of a signal outputted from a system control unit.

Next, in order to cope with the change in the load applied to the power source circuit when the signal recording/reproducing apparatus is in the standby state, the following configuration is obtained.

First, as a first method, the signal recording/reproducing apparatus includes a measuring unit for measuring a time and a storage unit for storing therein the time information and also includes means for setting in the above-mentioned storage unit the data relating to a time zone in which the possibility that a user uses the apparatus is low and the data relating to a time zone in which the possibility that a user uses the apparatus is high, or for automatically setting such data in the above-mentioned storage unit, wherein in the standby state having the time zone in which the possibility that a user uses the apparatus is low, the operation of the power source circuit is stopped to drive the system control unit and the peripheral circuits thereof by a battery. On the other hand, in the state having the time zone in which the possibility that a user uses the apparatus is high, after having activated the power source circuit, the necessary circuit blocks are driven.

In addition, as a second method, a single power source circuit includes two kinds of operation modes, i.e., the operation mode for a heavy load (first power source unit) and the operation mode for a light load (second power source unit), or two kinds of power source circuits for a heavy load and a light load are provided independently of each other. Then, in the case where the single power source circuit is provided with the two power source operation modes, the exclusive use is adopted in which in the standby state, the operation mode for the light load is used, while in the operation state, the operation mode for the heavy load is used.

In addition, in the case where the two kinds of power source circuits are provided independently of each other, for the blocks such as, typically, the system control unit, which are required to operate even in the standby state, the power source circuit for the light load is operated at all times, while the power source circuit for the heavy load is used only in the operation state.

Further, as a third method, both of the battery and the power source circuit are provided with two kinds of operation modes for a heavy load and a light load, and a time measuring instrument and a storage unit for storing therein the time information are provided, and also there is provided means for setting clearly in the storage unit the data relating to a time zone (first time zone) in which the possibility that a user uses the apparatus is low and the data relating to a time zone (second time zone) in which the possibility that a user uses the apparatus is high, or for setting automatically such data in the storage unit. In the time zone in which the possibility that a user uses the apparatus is low in the standby state, the operation of the power source circuit is stopped to drive the system control unit and the peripheral circuits thereof by the battery. On the other hand, in the time zone in which the possibility that a user uses the apparatus is high in the standby state, the power source circuit is driven in the operation mode for the light load so as to drive the circuit blocks which are required to be operated even in the standby state. In addition, when an operation instruction is issued from a user, the power source circuit is activated in the operation mode for the heavy load. In such a way, the electric power is supplied to each of the circuit blocks in accordance with the operation state.

BRIEF DESCRIPTION OF THE SEVERAL VIEWS OF THE DRAWINGS

These and other objects, features and advantages of the present invention will become more readily apparent from the following detailed description when taken in conjunction with the accompanying drawings wherein.

DESCRIPTION OF THE EMBODIMENTS

Preferred embodiments of the present invention will hereinafter be described in detail with reference to FIGS. 1 to 22. First, the configuration of the present embodiment will hereinbelow be described with reference to FIGS. 1 to 6.

Figure 1:
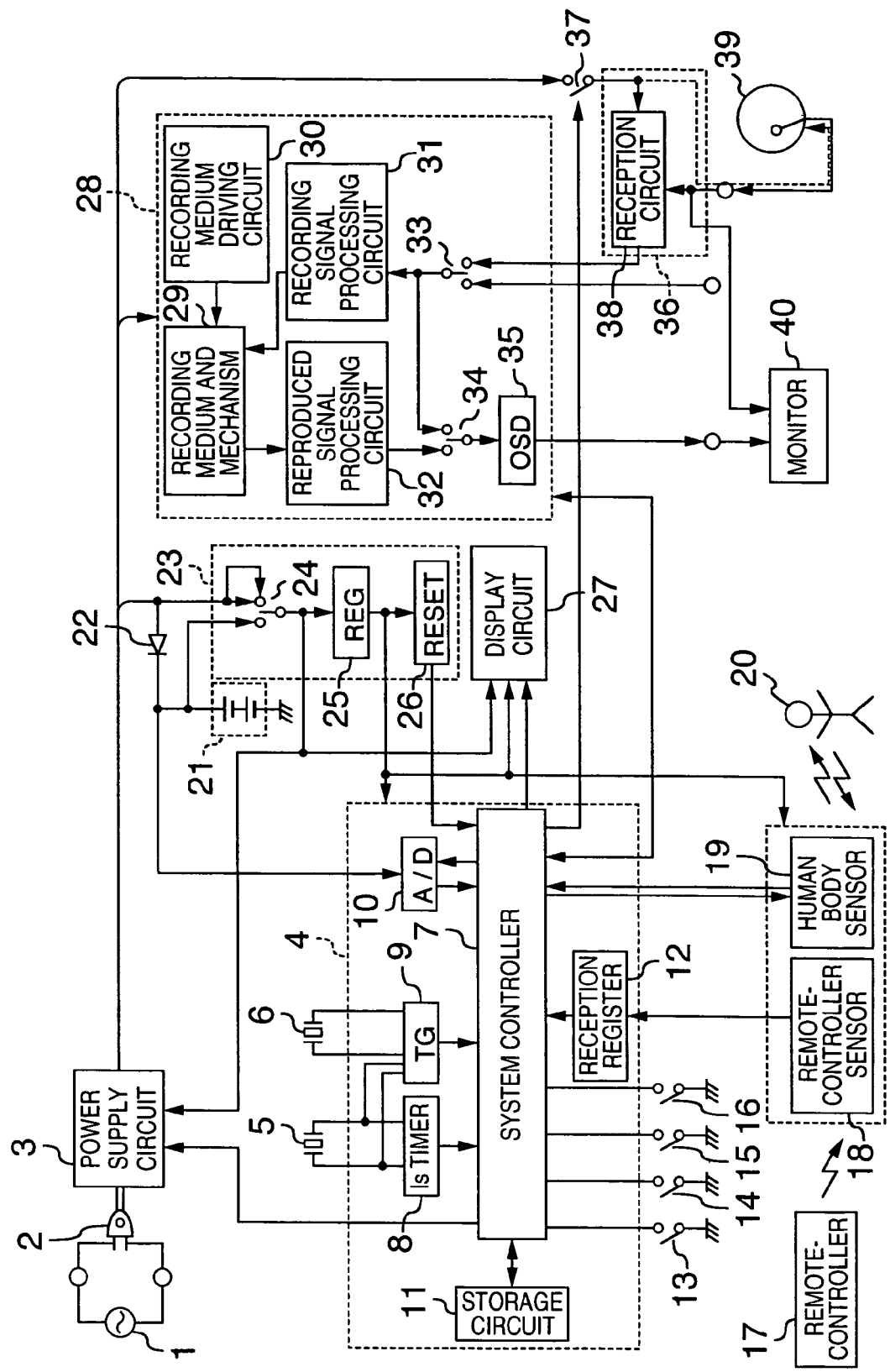
FIG. 1 is a block diagram useful in explaining the overall configuration of a first embodiment according to the present invention.

FIG. 1 is a block diagram showing the overall configuration of an apparatus for recording/reproducing a video signal to which the present invention is applied. Roughly calssifying, the overall configuration of the apparatus is divided into a power source circuit block, a system control block, a data recording/reproducing block, and a reception block. The configuration will hereinbelow be described in detail every block.

First, the configuration of the power source circuit block is as follows. That is, in FIG. 1, reference numeral 1 designates a commercial power source; reference numeral 2 designates a mains socket through which the data recording/reproducing apparatus is connected to the commercial power source; reference numeral 3 designates a power source circuit for generating a D.C. power source voltage from the commercial power source; reference numeral 21 designates a battery; reference numeral 22 designates a diode for preventing the electric power of the battery from influencing upon the power source circuit 3 when charging the battery 21 with an electric power signal which is generated in the commercial power source 1; reference numeral 24 designates a switch for selecting, when the power source circuit 3 generates the electric power signal, the electric power signal from the power source circuit 3 and for selecting, when the power source circuit 3 generates no electric power signal, the electric power signal from the battery 21; reference numeral 25, a voltage regulation circuit for regulating the electric power signal which is selected by the switch 24; and reference numeral 26, a reset pulse generator for supplying a reset signal to the system control unit. In this connection, reference numeral 23 designates an integrated circuit into which the switch 24, the voltage regulation circuit 25 and the reset pulse generator 26 are integrated.

Next, the configuration of the system control block is as follows. In FIG. 1, reference numerals 5 and 6 designate oscillators., respectively; reference numeral 7 designates a system controller; reference numeral 8 designates a timer interrupt circuit; reference numeral 9 designates a timing generator for selecting between clock signals which are respectively generated by the oscillators 5 and 6 or dividing them to supply the resultant signal to the system controller 7; reference numeral 10 designates an analog-to-digital (A/D) converter for converting an analog signal into a digital signal; reference numeral 11 designates a storage circuit; reference numeral 12 designates a remote controller reception register for storing temporarily therein an instruction signal which has been issued from a remote controller (hereinafter, referred to as "a remocon" for short, when applicable) 17; reference numerals 13 to 16 designate a switch group through which a user issues an instruction to the system controller; reference numeral 17, the remocon; reference numeral 18, a remocon reception sensor for receiving a signal which has been transmitted from the remocon to shape the waveform of the amplified signal; and 19, a human body sensor for detecting the presence of the human body. In this connection, the system controller 7 and the peripheral circuits thereof may be comprised of a microprocessor 4 which is integrated on one chip in many cases. Also, reference numeral 20 designates a schematic view of the human body.

In addition, the configuration of the data recording/reproducing block 28 is as follows. In the figure, reference numeral 29 designates a recording medium and a mechanism for driving the same; reference numeral 30 designates a circuit for driving the driving mechanism for the recording medium; reference numeral 31 designates a circuit for processing a recording signal; reference numeral 32 designates a circuit for processing a reproduced signal; reference numeral 33 designates a switch for switching the recording signal which is directly inputted from the outside and the a reception signal which is inputted from the reception block 36 over to each other; reference numeral 34, a switch for switching the reproduced signal and the recording signal over to each other for an output terminal; and 34, an on screen display (hereinafter, referred to as "an OSD" for short, when applicable) for displaying on a monitor 40 the character information in such a way as to be superimposed on the output signal.

In addition, the configuration of the reception block 36 and the peripheral units thereof is as follows. In the figure, reference numeral 38 designates a reception circuit; reference numeral 39 designates an antenna; and reference numeral 37 designates a switch for switching the supply and the interrupt of the electric power signal to and for the reception circuit and the antenna over to each other.

Next, description will hereinbelow be given with respect to a concrete example of the configuration of the power source circuit 3 with reference to FIGS. 2 and 3. First, the configuration shown in FIG. 2 will be described. In this connection, the description of the constituent elements which are designated by the same reference numerals as those in FIG. 1 is omitted here for the sake of simplicity. In the figures, reference numeral 41 designates a fuse for preventing the serious failure or accident from occurring due to the over-current resulting from that some abnormality or failure occurs in the apparatus; reference numeral 42 designates a diode bridge circuit for rectifying an A.C. electric power-signal from the commercial power source; reference numeral 43 designates a transformer for converting the swing level of the rectified signal; reference numerals 44 and 45 designate a diode detection circuit for smoothing a signal which is generated in one of the secondary windings of the transformer 43; reference numeral 46 designates a switching device for switching the conduction and the nonconduction of the rectified signal which is coupled to the primary winding of the transformer; reference numeral 48 designates a voltage regulation circuit for regulating the power source signal which is obtained by the smoothing made in the diode detection circuit 44, 45; reference numeral 49 designates a voltage controlled oscillator for generating a switching signal of the switching device 46 in response to the electric power supplied from the voltage regulation circuit 48; reference numeral 47 designates a driver circuit including principally the voltage regulation circuit 48 and the voltage controlled oscillator 49 for carrying out the switching control; reference numerals 50 and 51 designate a diode detection circuit for smoothing a signal which is generated in one of the secondary windings; reference numerals 52 and 53 designate a diode detection circuit for smoothing a signal which is generated in the other of the secondary windings; reference numeral 54 designates a photo-coupler for feeding the smoothed signal which is obtained in the diode detection circuit 50, 51 back to the voltage controlled oscillator 49 with the smoothed signal electrically insulated; reference numerals 55 and 56 designate a filter circuit for smoothing the signal which is outputted from the photo-coupler 54; reference numerals 57 and 58 designates respectively transistor switches each of which interrupts or passes therethrough the electric power signal which is obtained by the smoothing in accordance with an instruction issued from the system controller 7; reference numeral 59, a transistor for transmitting the electric power signal which is inputted from the system controller 7 and which is passed or interrupted to the switch 57 or 58; and 60, a voltage regulation circuit.

Next, description will hereinbelow be given with respect to the operation of the power source circuit shown in FIG. 2. First, the A.C. electric power signal which is supplied from the commercial power source 1 through the mains socket 2 and the fuse 41 is subjected to the full wave rectification in the diode bridge 42. The signal obtained through the full wave rectification is then coupled to one terminal of the primary winding of the transformer 43. In addition, the other terminal of the primary winding has the switching device 46 connected thereto by which the conduction and the nonconduction are switched over to each other on the basis of the signal generated by the voltage controlled oscillator 49 at a high frequency.

As a result, the full-wave rectified signal coupled to the primary winding of the transformer 43 is converted into the signal which has the much higher frequency component as compared with the frequency of the A.C. signal of the commercial power source so that the electric power on the secondary winding side can be transferred with the relatively small transformer 43. But, since the driver circuit 47 requires the electric power before the switching operation is carried out, the turn ratio of the secondary winding, to which the smoothing circuit 44, 45 is connected, to the primary winding needs to be ensured to some degree.

In such a way, the electric power signal transferred to the secondary winding is converted into the D.C. electric power signal by the smoothing circuit 50, 51 or 52, 53. Now, the electric power signal from the smoothing circuit 50, 51 is fed back to the voltage controlled oscillator 49 through the photo-coupler 54 and the filter circuit 55, 50. As a result, if the output signal of the smoothing circuit 50, 51 intends to fluctuate due to the fluctuation of the load, then the voltage controlled oscillator 49 operates so as to make variable the switching frequency or the duty ratio of the conduction to the nonconduction in order to regulate the output signal of the smoothing circuit 50, 51 at the desired voltage level.

Figure 2:
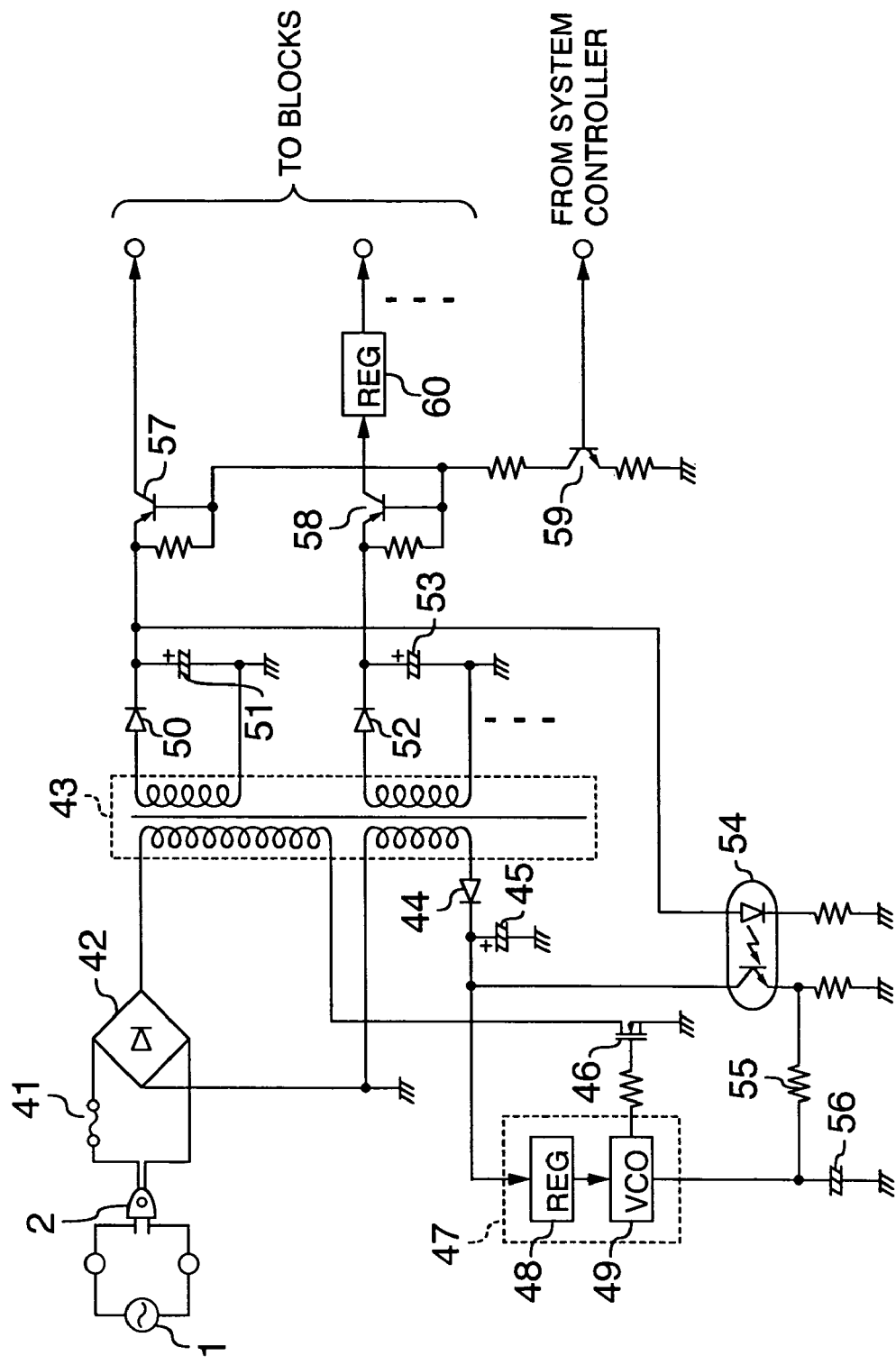
FIG. 2 is a circuit diagram useful in explaining a configuration of a first concrete example of a power source circuit block shown in the first embodiment.

In addition, while not illustrated in FIG. 2, in the case where there are a plurality of D.C. voltage levels which are to be generated, in the same manner as described above, the voltage level of the smoothed signal is transmitted through the photo-coupler which is specially prepared, and the output signals thereof are added to each other in the stage before the above-mentioned filter circuit 55, 56, whereby several smoothed signal outputs can be regulated at the same time. However, in the case where the changes in the loads which are driven by those smoothing signals are independent of each other and have no correlation, the voltage controlled oscillator can not properly operate since for which load fluctuation the control should be carried out is not clear for the voltage controlled oscillator.

Then, in the case where the D.C. electric power signals by which the loads are driven the changes of which have not the correlation so much is generated through another system, as illustrated in the stage after the smoothing circuit 52, 53 shown in FIG. 2, the voltage regulation circuit 60 is provided therein. In this connection, the turn ratio of the primary winding to the secondary winding is selected such that after having been regulated, the voltage level of the smoothed signal should become higher than the necessary desired voltage level. As a result, since even if the smoothed electric potential is fluctuated due to the load fluctuation of the D.C. power source of this system or another system, the voltage regulation circuit absorbs that change, it is possible to obtain the desired voltage level.

Next, description will hereinbelow be given with respect to the operation of interrupting the power source circuit 3 which operation is provided in accordance with the instruction issued from the system controller 7. The transistor switches 57 and 58 are respectively-provided in the stage after the smoothing circuits 50, 51 and 52, 53 and are switched over to each other on the basis of the switching signal outputted from the system controller 7. But, since the swing level of the output signal from the system controller 7 is limited to the level of the power source voltage signal which is supplied to the system controller 7, the D.C. electric power signal the level of which is higher than that level can not be switched. Then, the transistors 57 and 58 are switched over to each other through the operation of the transistor 59. In this connection, since in the present concrete example, the interrupt/conduction of all of the D.C. electric power signals (except the signal which is required by the driver circuit 47) is controlled on the basis of one switching signal, the transistor 59 is commonly connected to the transistors for switching the D.C. electric power signals. However, in the case where the independent interrupt/conduction is to be carried out, the two transistors 59 need to be independently provided together with the two switching control signals from the system controller. In this connection, while the order of providing the transistor switch 58 and the voltage regulation circuit 60 does not particularly become a problem, since the voltage level of the D.C. electric power signal generates the slight dispersion due to even the passage thereof through the transistor switch, in the present concrete example, in order to cope with this problem, the transistor switch 58 is provided in the stage before the voltage regulation circuit 60.

In addition, in the present concrete example, description has been given until now with respect to the concrete example of the two systems for the D.C. electric power signals which are supplied to the circuit blocks. However, how many systems the desired D.C. electric power signals require is different depending on the function and the specification of the apparatus. Therefore, in the following description, it is assumed that the smoothing circuit 52, 53, the voltage regulation circuit 60 and the secondary winding for supplying the switched electric power signal to the smoothing circuit 52, 53 and the voltage regulation circuit 60, and also if necessary, the interrupt/conduction switch are prepared for the number of necessary systems. In addition, this is also applied to the description of other examples of the power source circuit.

In the concrete example of the power source circuit shown in FIG. 2, the control of the interrupt and the conduction of the D.C. electric power signals to the circuit blocks is realized by providing the transistor switches on the lines, on the secondary side, through which the smoothed D.C. electric power signals are transmitted. In this case, the transistor switches need to be provided on the D.C. electric power signal lines of all of the systems (except the system for the driver circuit 47). In addition, even in the state in which the operation of the electric power source is interrupted, the driver circuit 47 is in the operation state at all times. Therefore, this configuration of the power source circuit 3 shown in FIG. 2 is not perfect in terms of the cost and the power consumption of the power source circuit.

Then, a concrete example of a second power source circuit 3 will hereinbelow be described with reference to FIG. 3. First, the configuration of the power source circuit 3 shown in FIG. 3 will now be described. But, since most of the configuration of the power source circuit 3 shown in FIG. 3 is the same as that of the power source circuit 3 shown in FIG. 3, description will be given with respect to only the different constituent elements. In FIG. 3, reference numeral 61 designates a transistor switch for switching the interrupt and the conduction of the D.C. electric power signal from the battery over to each other, and reference numeral 63 designates a transistor switch for interrupting/conducting the D.C. electric power signal from the smoothing circuit 44, 45. In this connection, in this concrete example, both of the transistor switches 57 and 58 are removed which are provided in the stage after the smoothing circuits 50, 51 and 52, 53 of FIG. 2, respectively.

Next, description will hereinbelow be given with respect to the operation of the power source circuit shown in FIG. 3. But, since most of the operation of the power source circuit shown in FIG. 3 is the same as that of the power source circuit shown in FIG. 2, description will now be given with respect to only the different portions. First, in order to stop the operation of the power source circuit 3, the transistor switch 63 is provided in the stage after the smoothing circuit 44, 45, and the interrupt and conduction thereof are switched over to each other on the basis of the switching control signal from the system controller 7. As a result, since the supply of the electric power to the driver circuit 47 is interrupted, the oscillation of the switching signal generated by the voltage controlled oscillator 49 is stopped. Then, the switching device 46 constitutes the output circuit of the voltage controlled oscillator in order to be the nonconducting state as a result of stopping the oscillation of the voltage controlled oscillator 49 (conversely, in the power source circuit shown in FIG. 2, in the state of stopping the oscillation, it is necessary to provide the state in which the primary winding conducts at all times. As a result, in the power source circuit of FIG. 2, upon connection of the power feed cord to the mains socket, the oscillation is started). As a result, the primary winding of the transformer 43 becomes the nonconducting state, no rectified signal is transmitted to the secondary winding side and also no D.C. electric power signal is generated on the secondary side. Therefore, no electric power is supplied to any of the circuit blocks.

Next, description will hereinbelow be given with respect to the operation of activating the power source circuit 3. First, the electric power signal from the battery 21 shown in FIG. 1 is coupled to the driver circuit 47 through the transistor switch 61. For a time period in which the power source circuit 3 is to be left stopped, the operation of the transistor switch 61 is interrupted on the basis of the switching control signal from the system controller 7. Then, the instruction issued from the system controller 7 causes the transistor switch 61 to conduct when the power source circuit 3 needs to be activated. As a result, since the electric power is supplied to the driver circuit 47, the voltage controlled oscillator 49 starts to oscillate. Thus, since the switching signal for the rectified signal is supplied to the primary winding side of the transformer 43, the electric power is also supplied to the secondary winding side for supplying the electric power to the circuit blocks. As a result, there is provided the state in which the D.C. electric power signal is generated in the smoothing circuit 44, 45 as well. Then, the transistor switch 61 is made the nonconducting state and also the transistor switch 63 is caused to conduct, thereby completing the activation of the power source circuit.

In this connection, while in the present concrete example, there is adopted the configuration wherein the electric power is supplied from the battery 21 to the driver circuit 47, the electric power from the battery 21 may be supplied in the stage after the voltage regulation circuit 48. In addition, in order that the transistor switches 61 and 63 may be switched on the basis of the output signal from the system controller 7, there may be the possibility that as in the transistor 59 shown in FIG. 2, the transistor for converting the swing level is required. However, that transistor is not shown in FIG. 3 for the sake of simplicity.

Figure 3:
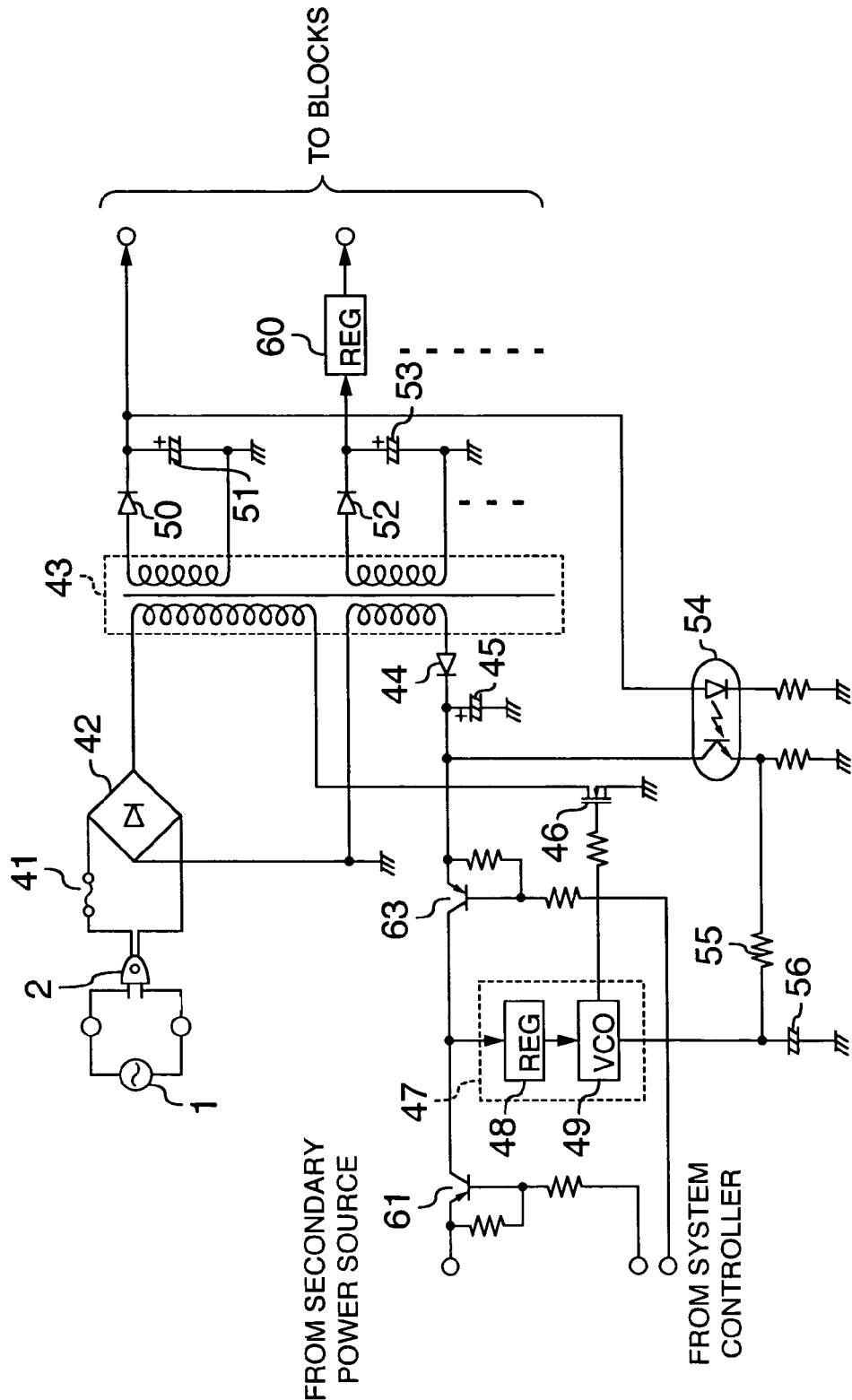
FIG. 3 is a circuit diagram useful in explaining a configuration of a second concrete example of the power source circuit block in the first embodiment.

As described above, by configuring the power source circuit as shown in FIG. 3, there is obtained the effect that since the number of transistor switches for stopping/activating the power source circuit 3 can be reduced and also the power consumption in the driver circuit 47 can be suppressed, the cost and the power consumption can be reduced.

Figure 4:
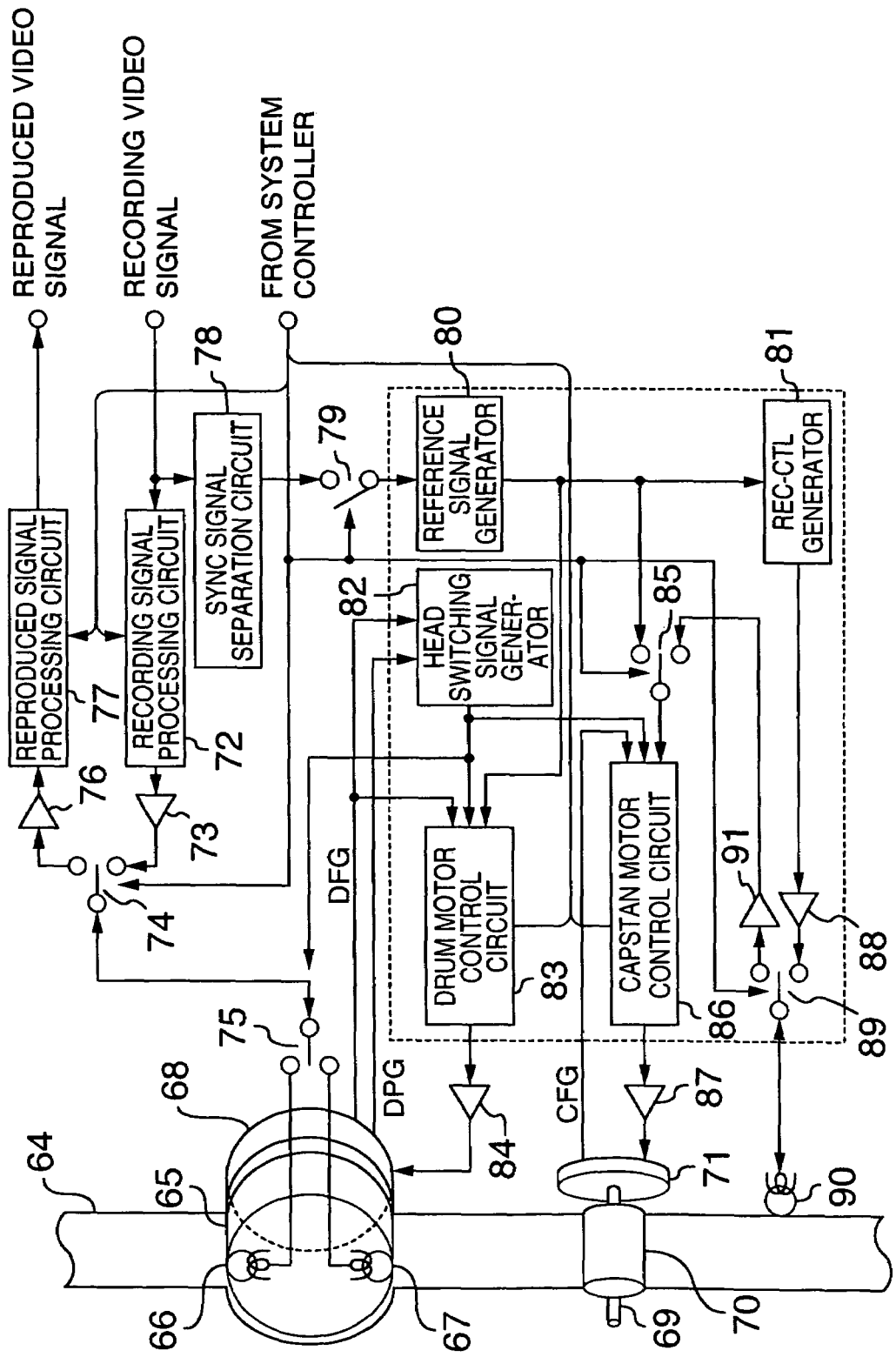
FIG. 4 is a block diagram useful in explaining a configuration of a first concrete example of a data recording/reproducing block in the first embodiment and a second embodiment.
Figure 5:
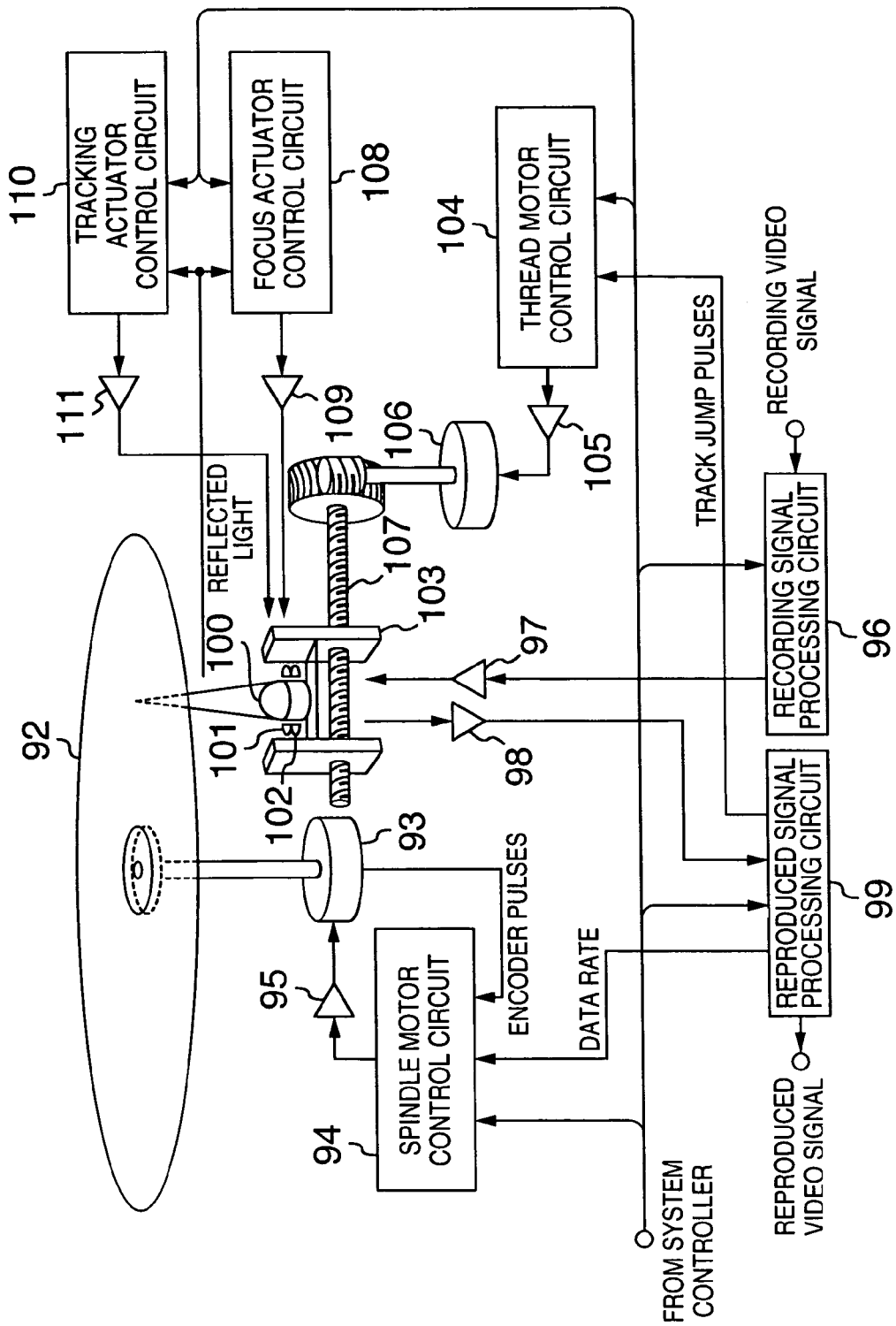
FIG. 5 is a block diagram useful in explaining a configuration of a second concrete example of the data recording/reproducing block in the first and second embodiments.

Next, description will hereinbelow be given with respect to a concrete example of a configuration of the data recording/reproducing block with reference to FIGS. 4 and 5. FIG. 4 is a circuit diagram showing a configuration of an example of a herical scan type video tape recorder (hereinafter, referred to as "a VTR" for short, when applicable) in which a magnetic tape is utilized as a recording medium.

First, the configuration of the VTR will now be described. First, the configuration of the recording medium and the mechanism for driving the same is as follows. That is, in FIG. 4, reference numeral 64 designates a magnetic tape; reference numeral 65 designates a head drum having magnetic heads 60 and 67 provided on the cylindrical and peripheral surface thereof; reference numeral 68 designates a drum motor for rotating the head drum 65; reference numeral 69 designates a capstan shaft for making the magnetic tape 64 travel with the magnetic tape 64 held between the capstan shaft 69 and a pinch roller 70; and reference numeral 71 designates a capstan motor for rotating the capstan shaft 69.

Next, the system for processing the recording signal/reproduced signal is configured as follows. In FIG. 4, reference numeral 72 designates a recording signal processing circuit for carrying out the modulation processing which is required when recording an inputted recording video signal on the magnetic tape 64; reference numeral 73 designates a recording amplifier for amplifying the recording signal which has been modulated; reference numeral 74 designates a switch for switching the modulated recording signal and the modulated and reproduced signal over to each other; reference numeral 75 designates a switch for selecting between the two magnetic heads 66 and 67; and reference numeral 77 designates a reproduced signal processing circuit for demodulating the modulated and reproduced signal which has been amplified by a reproducing amplifier 76.

Next, description will now be given with respect to the configuration of the driving circuit system of the recording medium driving mechanism. In FIG. 4, reference numeral 78 designates a synchronous signal separation circuit for separating the synchronous signal from the recording video signal; reference numeral 79 designates a switch for synchronizing the recording video signal and the reference signal with each other; reference numeral 81 designates a circuit for generating a signal representing the phase of the recording track (hereinafter, referred to as "a CTL signal" for short, when applicable); reference numeral 82 designates a circuit for generating a switching signal for the two magnetic heads (hereinafter, referred to as "an HSW signal" for short, when applicable); reference numeral 83 designates a circuit for controlling the rotating speed and the phase of the drum motor; reference numeral 84 designates a motor driver amplifier; reference numeral 85 designates a switch for switching the reference signal and the reproduced CTL signal over to each other; reference numeral 86 designates a circuit for controlling the speed and the phase of the capstan motor; reference numeral 87 designates a motor driver amplifier; reference numeral 88, a recording amplifier for the CTL signal; reference numeral 89, a switch for switching the recording CTL signal and the reproduced CTL signal over to each other; and 90, a CTL head for recording or reproducing the CTL signal on or from the magnetic tape. The foregoing is the configuration of the data recording/reproducing block of the VTR.

Next, description will hereinbelow be given with respect to the operation of the data recording/reproducing block of the VTR. First, the description will now be given with respect to the operation of processing the signals for the data recording/reproducing. The recording video signal is subjected to the modulation processing for recording/reproducing the data on/from the magnetic tape 64 in the recording signal processing circuit 72. For example, in the case of the VTR for the analog recording, the luminance signal is subjected to the frequency modulation, so that the carrier color chrominance signal is converted into the signal having the low frequency. On the other hand, in the case of the VTR for the digital recording, the bit stream of an inputted digital signal is packetized and then is subjected to the phase shift keying modulation and the like. The modulated recording signal thus generated is amplified by the recording amplifier so as to have the proper recording amplitude, and then is supplied to the magnetic heads 66 and 67 through the switches 74 and 75 to be recorded on the magnetic tape 64.

On the other hand, in the reproducing operation, the modulated and reproduced signal reproduced by the magnetic heads 66 and 67 is transmitted to the reproducing amplifier 76 through the switches 75 and 74. The modulated and reproduced signal is amplified by the reproducing amplifier 76 so as to have the proper level, and then is subjected to the demodulation processing corresponding to the modulation method as described above in the recording operation to reproduce the reproduced signal.

Next, description will hereinbelow be given with respect to the operation of the driving circuit for the recording medium. The herical scan type video tape recorder records the data in the inclined tracks on the magnetic tape. In this case, for example, in the case of the VTR for the analog recording, it is established by the related standards that the vertical synchronous signal of the recording video signal should be recorded at the predetermined height in the direction of the tape height. For this reason, the phase of the recording signal and the rotational phase of the drum motor need to be synchronized with each other. For this reason, the vertical synchronous signal is separated from the recording video signal in the synchronous signal separation circuit 78. On the other hand, in the case of the VTR for the digital recording, too, the recording bit stream is packetized and recorded in the inclined track. In this case as well, since one packet needs to be written to one track with the phase which is established by the related standards, the synchronous signal of the packet needs to be generated from the recording bit stream (not shown). In any case, the signal synchronized with the recording signal is extracted from the recording signal to be supplied to the reference signal generating circuit 80 through the switch 79.

Next, description will hereinbelow be given with respect to the operation of controlling the rotation of the drum motor 68. Firstly, a sensor (not shown) which generates the signal having the frequency which is in proportion to the rotating speed (hereinafter, referred to as "a DFG signal" for short, when applicable) is mounted to the drum motor. Then, the drum motor controlling circuit 83 compares the frequency or the period of the DFG signal with a predetermined frequency or period instructed by the system controller 7 to generate a speed control signal. In addition, a sensor (not shown) which detects the rotational phase (hereinafter, a rotational phase detection signal of the drum motor will be referred to as "a DPG signal" for short when applicable) is mounted to the drum motor. On the basis of the phase of the DPG signal or the DFG signal which is specified by the DPG signal, the HSW signal generating circuit 82 generates a timing signal (HSW signal) with which the magnetic heads 66 and 67 are switched over to each other for the magnetic tape 64. Then, the drum motor control circuit 83 compares the phase difference between the HSW signal and the reference signal generated by the reference signal generating circuit 80 with a predetermined phase difference instructed by the system controller 7 to generate a phase control signal. The drum motor controlling circuit 83 supplies a motor control signal which is obtained by adding the above-mentioned speed control signal and the phase control signal to each other to the motor driver amplifier 84. As a result, the control for the rotating speed and the phase of the drum motor is realized.

In this connection, the control for the drum motor in the reproducing operation is as follows. In the case of the analog signal recording, since the video signal to be reproduced contains therein the synchronous signal, in particular, there is no need of synchronizing that video signal with the signal which is supplied from outside. For this reason, the switch 79 is released in accordance with the instruction issued from the system controller 7, and the drum motor is rotated synchronously with the internal reference signal generated by the reference signal generating circuit 80. On the other hand, in the case of the digital signal recording, since the reproduced signal processing circuit 77 needs to grasp the phase of the packet to be reproduced, some synchronous signal is generated (not shown) by the reproduced signal processing circuit 77 to be supplied (not shown) to the reference signal generating circuit 80.

Next, description will hereinbelow be given with respect to the operation of controlling the rotation of the capstan motor 71. A sensor (not shown) which generates a signal having the frequency which is in proportion to the rotating speed (hereinafter, referred to as "a CFG signal" for short, when applicable) is mounted to the capstan motor 71. The capstan motor controlling circuit 86 compares the frequency or the period of the CFG signal with a predetermined frequency or period instructed by the system controller 7 to generate the speed control signal.

In addition, in the recording operation, the capstan motor controlling circuit 80 compares the phase difference between the reference signal generated by the reference signal generating circuit 80 and the dividing signal of the CFG signal with a predetermined phase difference supplied from the system controller 7 to generate a phase control signal. The capstan motor controlling circuit 86 supplies a motor control signal obtained by adding the above-mentioned speed control signal and the phase control signal to each other to the motor driver amplifier 87. As a result, the speed and the phase in the recording operation of the capstan motor 71 are controlled.

In this connection, the reference signal in the recording operation is recorded in the linear track on the magnetic tape by the CTL head 90 through the recording CTL generating circuit 81, the recording CTL amplifier 88 and the switch 89. In the reproducing operation, the capstan motor controlling circuit 86 reads out the CTL signal from the linear track to control the phase difference between the CTL signal thus read out and the HSW signal so as to obtain the phase difference therefrom which is prescribed by the standards. As a result, even if the magnetic tape is expanded and contracted due to the change in the environment for a time period ranging from a time point of the recording to a time point of the reproducing, the fixed relation is established between the rotation of the drum motor and the travelling amount of track. The foregoing is the configuration and the operation of the concrete example of the data recording/reproducing block of the video tape recorder.

Next, description will hereinbelow be given with respect to another concrete example of the data recording/reproducing block with reference to FIG. 5. FIG. 5 is a block diagram, partly in perspective view, showing a configuration of the apparatus wherein an optical disc is utilized as the recording medium. First, description will now be given with respect to the construction of the mechanism system. In FIG. 5, reference numeral 92 designates an optical disc; reference numeral 93 designates a spindle motor for rotating the optical disc 93; reference numeral 100 designates a lens for focusing the recording light or the reproducing light on the surface of the optical disc; reference numeral 101 designates a focus actuator for controlling the focusing position against flapping or deflection of the disc surface; reference numeral 102 designates a tracking actuator for making the recording light or the reproducing light follow the fluctuation of the track position due to the decentering of the disc center; reference numeral 103, a thread which serves to support the lens 100 and to move on a shaft 107 along with the rotation of the shaft 107 to change the access position of the disc; and 106, a thread motor for moving the thread.

Next, description will now be given with respect to a configuration of the circuit system for driving the mechanism. In FIG. 5, reference numeral 94 designates a circuit for controlling the rotating speed of the spindle motor 93; reference numeral 104 designates a control circuit, for the thread motor, for controlling the rotation angle of the thread motor; reference numerals 95 and 105 designate respectively motor driver amplifiers; reference numeral 108 designates a control circuit for carrying out the position control for the focus actuator 101; reference numeral 110, a control circuit for carrying out the position control for the tracking actuator 102; and reference numerals 109 and 111, actuator driver amplifiers.

In addition, a configuration of the signal processing system is as follows. In the figure, reference numeral 96 designates a recording signal processing circuit for subjecting the digital bit stream inputted to the modulation; reference numeral 97 designates a recording amplifier; reference numeral 98 designates a reproducing amplifier; and reference numeral 99 designates a reproduced signal processing circuit for demodulating the modulated signal reproduced and for decoding the digital bit stream into the analog signal. In this connection, the reproduced signal processing circuit 99 generates, when having moved the thread, a track jump signal on the basis of the difference between the reproduced signal level in the track in which the signal is present and the reproduced signal level in the off track in which no signal is present, and also reproduces the data clock signal which is synchronized with the demodulated bit stream.

Next, description will now be given with respect to the operation of recording/reproducing the data of the optical disc. Firstly, a sensor for generating the pulses (the encoder pulses) the number of which is in proportion to the rotating speed is provided in the spindle motor 93 for rotating the optical disc. In the recording operation, the spindle motor controlling circuit 94 compares the number of encoder pulses with the predetermined number of pulses instructed by the system controller 7 in order to control the speed of the motor. On the other hand, in the reproducing operation, in addition to the control based on the encoder pulses, the spindle motor controlling circuit 94 carries out the control so that the frequency of the data clock signal synchronized with the bit stream of the reproduced signal obtained in the reproduced signal processing circuit 99 becomes to have the fixed period.

In addition, when the request of changing the access position is made from the system controller 7, the thread motor controlling circuit 104 activates the thread motor 106 and then counts the track jump pulses which are sent to the reproduced signal processing circuit 99, and when the thread motor 106 has moved to the desired position, stops the rotation of the thread motor 106.

In addition, the tracking actuator controlling circuit 110 detects the reflected light of the recording light or the reproducing light from the surface of the optical disc using a plurality of sensors (not shown) and then detects whether the tracking position is on the disc center side or on the opposite side with respect to the track direction on the basis of the detection time difference between the reflected light detected on the disc center side and the reflected light detected on the opposite side in order to control the actuator. The focus actuator controlling circuit 108 detects the reflected light passing through the lens (not shown), which is obtained by piling the several deformed lens elements up to one another, using a plurality of sensors (not shown). As a result, when the focusing is inperfect, the dispersion occurs between the output signals of the sensors, and the actuator is controlled with this difference as the control value.

The above description is directed to the two concrete examples of the data recording/reproducing block. In addition to the above-mentioned concrete examples, as another concrete example of the recording/reproducing block, a semiconductor memory may be employed as the recording medium. But, in the case of the semiconductor memory, since accessing to the data recording/reproducing location is made on the basis of an electrical signal called an address, no mechanical system for driving the recording medium is provided.

The above description has been given with respect to the configuration of the apparatus of the first embodiment according to the present invention, and the configurations and the operation of the concrete examples of the power source circuit and the data recording/reproducing block which are employed in the same. Now, returning back to FIG. 1 again, the operation of the present embodiment will hereinbelow be described in detail with reference to FIGS. 6A and 6B to 22.

First, description will hereinbelow be given with respect to the operation of supplying the electric power signal to the circuit blocks of the data recording/reproducing apparatus of the present embodiment with reference to FIG. 1. First, the D.C. electric power signals for the necessary number of systems are generated from the commercial power source in the power source circuit 3. When, of the D.C. electric power signals, the D.C. electric power signal which is required by the microprocessor 4 is generated, the switch 24 is switched by that D.C. electric power signal itself to select that D.C. electric power signal. Conversely, when in accordance with the instruction issued from the system controller 7, the operation of the commercial power source 3 is stopped so that no D.C. electric power signal is generated, the switch 24 selects the D.C. electric power signal generated by the battery 21. As a result, as long as the necessary electric power is stored in the battery 21, the D.C. electric power signal is obtained in the output of the switch 24 irrespective of whether or not the power source circuit 3 is generating the electric power signal. The D.C. electric power signal thus obtained is supplied to the display circuit 27 and if necessary, to the power source circuit (i.e., the power source circuit shown in FIG. 3). In addition, for the circuit system which requires the lower voltage than each of those voltages, the voltage regulation circuit 25 is provided in the stage after the switch 24 to drop stably the voltage level. Then, the resultant D.C. voltage is supplied to the microprocessor 4 including the system controller 7 and the peripheral circuits thereof, the block of the sensor system for the remocon reception 18 and the human body detection 19, and the display circuit 27.

From the foregoing, even if the operation of the power source circuit 3 is stopped in accordance with the instruction issued from the system controller 7, each of the above-mentioned circuits is in operable state. In addition, when the power source circuit 3 is in operation, the battery 21 is charged with the D.C. electric power signal generated by the power source circuit 3 through the diode 22. Therefore, as long as the apparatus is operated at a suitable time interval, the electric charge accumulated in the battery 21 is not discharged at all.

However, if the standby time becomes long, then the electric charge accumulated in the battery 21 will have been discharged sooner or later. In this case, since any of the stored values in the volatile recording area of the storage circuit 11 in which the data relating to the control state of the system controller 3, the time and the like is stored are also lost, there is the possibility that even if the supply of the electric power is simply restarted, the apparatus can not be properly operated. In order to cope with this problem, at the time when the D.C. signal is outputted to the output terminal of the voltage regulation circuit 25, the reset circuit 26 generates the reset pulse for the microprocessor 4 to initialize the state of the system controller 7.

Figure 6A:
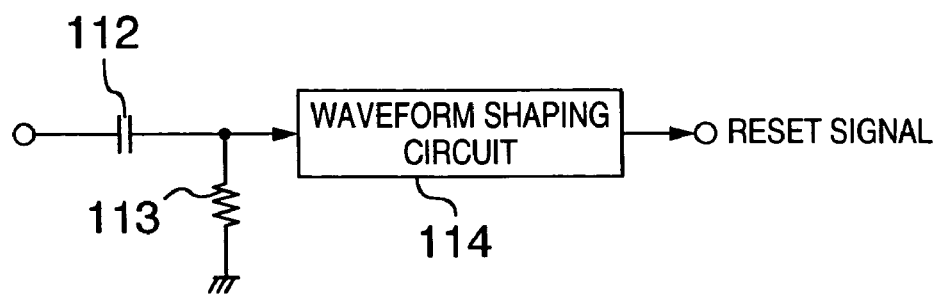
FIG. 6A is a circuit diagram useful in explaining a configuration of a concrete example of a reset signal generating circuit of a system control block in the first embodiment.
Figure 6B:
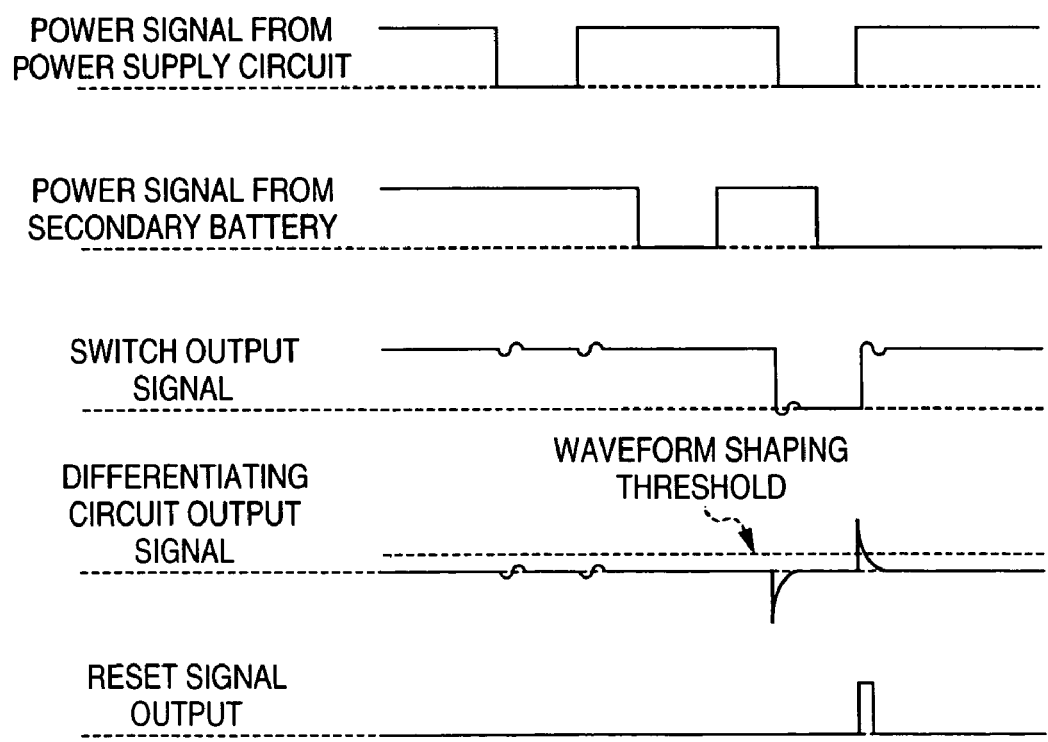
FIG. 6B is a waveform chart useful in explaining a concrete example of operation waveforms in the reset signal generating circuit shown in FIG. 6A.

FIG. 6A shows a concrete example of this reset circuit 6, and FIG. 6B shows the operational waveforms thereof. Even if the supply of the D.C. electric power signal from one of the power source circuit 3 or the battery 21 is stopped, the output of the switch 24 is not substantially changed (the level difference between the two D.C. electric power signals may appear thereat or so forth). However, if the output signals of both of the power sources are interrupted at the same time, then the large signal change will appear at the output terminal of a differentiating circuit 112, 113. Then, this differential signal is waveform-shaped on the basis of a suitable threshold, which enables the reset signal to be obtained. Therefore, if after the electric power signals of both of the power source circuit 3 and the battery 21 have been interrupted (or discharged), the supply of the electric power signal from one of them is restarted, then the reset pulse is generated.

Figure 7:
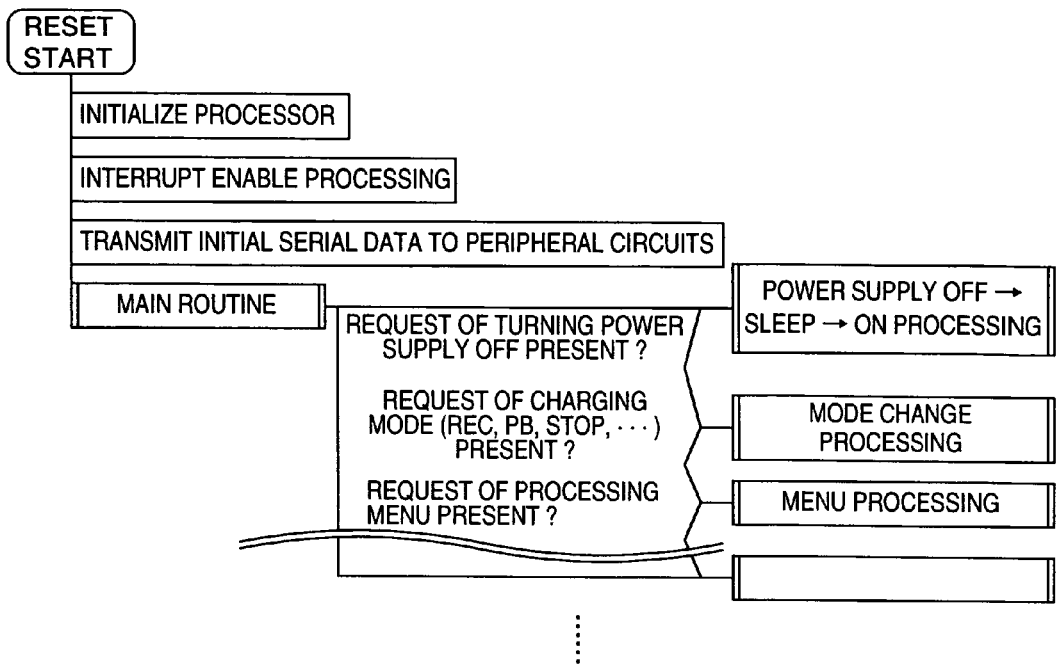
FIG. 7 is a PAD diagram useful in explaining the outline of the overall processing in the system control block in the first embodiment.

In response to the reset signal, the microprocessor 7 executes the program which is stored in a predetermined location of the volatile area of the storage circuit 11. FIG. 7 is a PAD (Program Algorithm Diagram) showing an example of the program. First, in the reset program, the initialization of the processor is carried out. As for the contents of the initialoization, for example, the general microprocessor is designed such that the terminal circuit can be used as either the input or the output, and hence the selection between the functions thereof needs to be carried out. Or, the microprocessor 7 executes the processing of setting the value in the volatile storage area of the storage circuit 11 to the predetermined value. Next, the interrupt enable to each of the interrupt processing circuits in the microprocessor 7 is carried out. For example, the 1 s timer interrupt circuit subjects the signal which is oscillated by the oscillator 5 having the frequency of 32.768 kHz to division by 32,768 (this value is 2 to the 15th power, and hence this unit can be constituted by the simplest binary counter), whereby the interrupt processing request at intervals of 1 sec (it is freely selected by changing the dividing ratio. In this case and the following cases as well, it is provisionally made 1 sec) is made to the system controller 7. In addition, if the manipulation instruction data from a user is stored in the reception register 12 on the basis of the transmission signal from the remote controller 17, then the reception register 12 requests the system controller 7 to carry out the decoding of the received data and the interrupt processing of the change processing of the operation mode therefor. In addition, as in the switches 13 to 16, the interrupt processing can be executed even on the basis of the signal which is coupled to any one of the terminals of the microprocessor 4. For example, if it is assumed that the switch 13 is the terminal through which the stop and the start of the operation of the power source circuit is switched over to each other, then the request of the interrupt processing can be made to the system controller 7 on the basis of the change in the level of the signal applied to the terminal. Moreover, while as for the interrupt processing function of the microprocessor, in addition to the above-mentioned function, in general, there are various functions, those are not necessarily related to the present embodiment.

Returning back to the description of the reset program again, when the interrupt enable processing has been completed, initialization is carried out next for each of the circuit blocks of the overall apparatus. In this case, if the terminals of the microprocessor 4 are assigned one by one to all of the setting information, then the number of terminals is increased whenever the number of functions to be set is increased. Then, the setting information may be made in a serial bit stream data form to be transmitted to the circuit blocks in many cases.

When the initialization of the microprocessor and the overall apparatus has been completed in a manner as described above, the processing of the reset program as the initialization program is completed, and then the processing proceeds to the main processing as in the system controller. In the main processing, there is provided the state in which the above-mentioned interrupt processing is accepted at all times. If no interrupt processing request is made, then the main processing is repeatedly executed, while if the interrupt processing request is made, then the main processing is temporarily suspended in order to execute the interrupt processing. If the interrupt processing has been completed, then the main processing which has been suspended until now is restarted.

With respect to the main contents of the main processing, if the request of turning OFF the power source is made from each of the interrupt processings, then the processing of turning OFF the power source is executed. In addition, if the request of changing the operation mode (recording, reproducing and stop) of the apparatus is made through the remocon or any one of the terminals (switches 14, 15 and 16), then the control signal therefor and the serial data to the circuits are transmitted. Or, if the request of setting various information of a user is made for the apparatus by utilizing the OSD circuit 35, then the menu processing is executed. While in addition thereto, there is the possibility that the various processings corresponding to the functions, which is provided in the apparatus, such as the request of changing the reception channel made through the remocon may be executed in the main processing, this is not necessarily related to the present embodiment and hence the description thereof is omitted here for the sake of simplicity.

Figure 8:
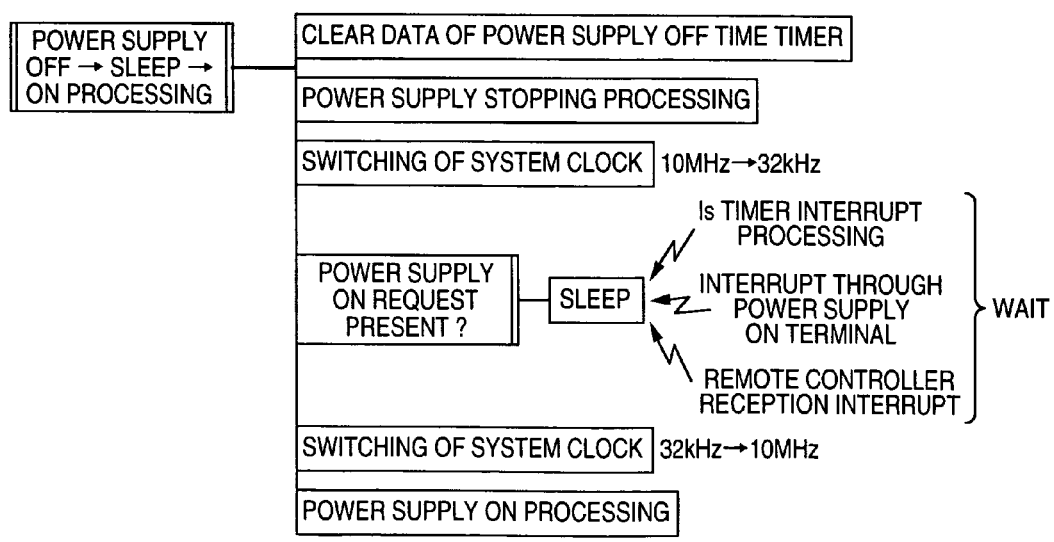
FIG. 8 is a PAD diagram useful in explaining a first concrete example relating to a processing of turning ON/OFF a power source in the system control block of the first embodiment.
Figure 9:
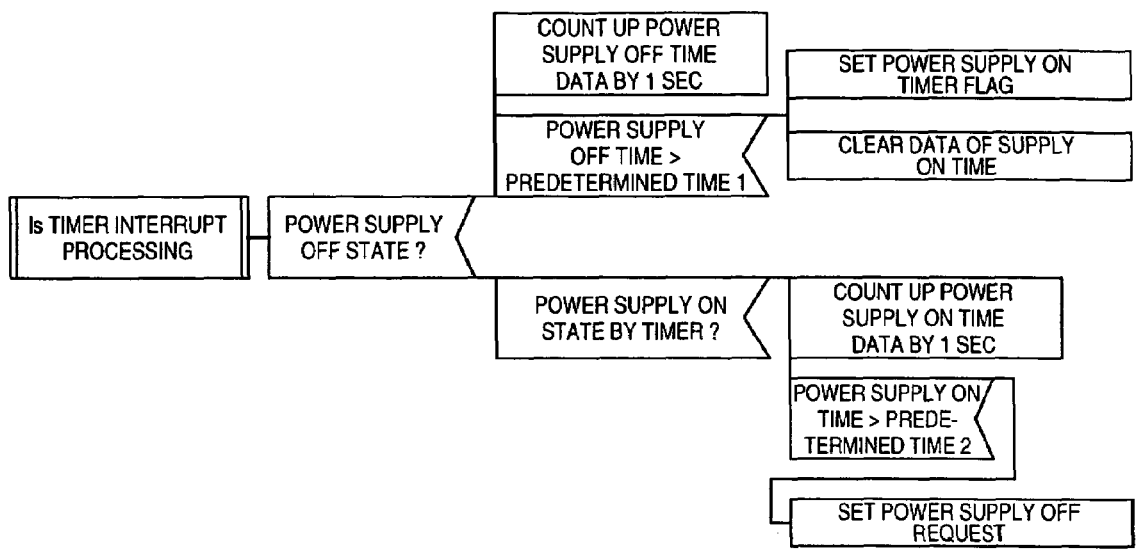
FIG. 9 is a PAD diagram useful in explaining a concrete example of a timer processing for the first concrete example of a processing of turning ON/OFF a power source in the system control block of the first embodiment.
Figure 10:
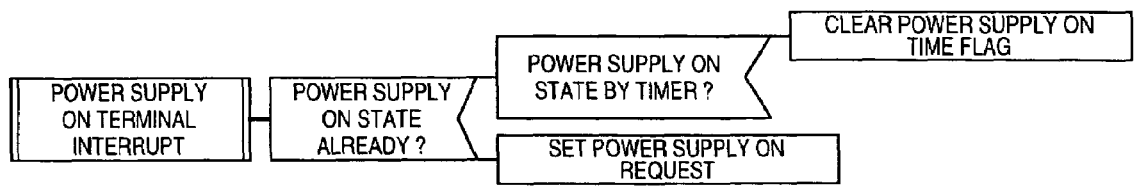
FIG. 10 is a PAD diagram useful in explaining a concrete example of a terminal interrupt processing for the first concrete example of a processing of turning ON/OFF a power source in the system control block of the first embodiment.

Next, it was already stated in the above description that when the interval with which the apparatus is operated by a user is long, there is the possibility that the battery 21 may be discharged. In the present embodiment, in order that the battery 21 may be prevented from being discharged irrespective of the use interval of a user, the following method is adopted. FIGS. 8 to 10 show a first operation example therefor in the system controller 7, and this example will hereinbelow be described.

FIG. 8 is a PAD diagram showing in more detail the processing of turning OFF the power source in the main processing shown in FIG. 7. In order to simplify the description, it is assumed that the request of stopping the operation of the power source is made by a user. Then, the processing of turning OFF the power source is called from the main processing so that the processing proceeds to the processing of turning OFF the power source shown in FIG. 8. In the processing of turning OFF the power source, first, the value of the power source OFF time of the timer data which is prepared in the volatile area of the storage circuit 11 is cleared (zero is set thereto). Then, the processing of turning OFF the power source which was already described with reference to FIGS. 2 and 3 is executed. In this connection, while not particularly described until now, in the microprocessor 4, the signal (in this case, the frequency thereof is provisionally 10 MHz, and so forth) which is oscillated by the oscillator 6 is selected by the timing generator to be made the operation clock for system controller 7. By the operation clock is meant the time of a minimum unit when decoding and executing the program, which is stored in the non-volatile area of the storage circuit 11, by the system controller 7. Therefore, the speed of executing the program is increased as the operation clock is longer. But, the power consumption in this case is also increased. Then, many microprocessors have generally the function of switching the operation clock. The microprocessor 4 of the present embodiment has such a function, and switches the operation clock over to the clock of 32.678 kHZ which is oscillated by the oscillator 5 so that the operation mode thereof proceeds to the operation mode with the low power consumption. Further, the mode of the microprocessor 4 proceeds to a sleep mode in which the execution of the program is temporarily stopped.

The sleep mode is released when one of the processing requests of the above-mentioned 1 s timer interrupt, power source ON terminal interrupt or remocon reception register interrupt has been made. If those requests contain the request of turning ON the the power source, then the system clock of 32 kHZ proceeds to that of 10 MHz and in addition to the processing of activating the power source circuit 3, the processing of turning ON the power source a part of which overlaps with the reset processing, such as the processing of transmitting the serial data to the circuit blocks is executed, and then the processing is returned back to the main processing shown in FIG. 7. On the other hand, if any of such interrupt processing requests contains no request of turning ON the power source, the operation mode proceeds to the sleep mode again. The foregoing is the processing of turning OFF the power source and the processing until the operation mode is returned from the power source OFF state back to the power source ON state which processing is executed by the system controller 7.

Next, FIG. 9 is a PAD diagram showing a concrete example of the 1 s timer interrupt processing and this example will hereinbelow be described. In the 1 s timer interrupt processing, if the power source circuit 3 is in the stop state, then the power source OFF time timer data which was initially cleared in the processing of turning OFF the power source is counted up by 1 sec. Then, if for the power source OFF time timer data, a predetermined time period has elapsed, then the request of turning ON the power source is set and also the flag data which represents that the power source ON is generated due to the time-up of the timer interrupt is set in the volatile storage area of the storage circuit 11. In addition, the power source ON time timer data which is prepared in the volatile storage area of the storage circuit 11 is cleared to zero to complete the interrupt processing.

On the other hand, if the power source circuit 3 is in the operation state, it is discriminated whether or not that state is the state in which the power source has been turned ON on the basis of the time-up resulting from the timer interrupt processing during the power source OFF. If so, then the power source ON time timer data is counted up by 1 sec, and if this time exceeds a predetermined time, then the request of turning OFF the power source is set to complete the interrupt processing.

Next, FIG. 10 is a PAD diagram showing a concrete example of the processing of the power source ON interrupt generated through the terminal and this example will hereinbelow be described. In this connection, since in the case as well where the interrupt request has been made through the remocon reception register, the same processing is executed, including the following description, the description will be represented by the description of the processing of the interrupt generated through the power source ON terminal. In the processing of the power source OFF interrupt request made through the terminal (or through the remocon), as compared with the power source ON processing, the direction of the control is opposite thereto, and the logic of the condition of setting the information data flag is no more than opposite thereto. For this reason, in all of the following description, the description from the terminal (or from the remocon) will be represented by the description of the processing of turning ON the power source and also the supplementary description will be given with respect to only the necessary portion.

In the interrupt processing based on the request of turning ON the power source made through the terminal (or through the remocon), the following processing is executed. That is, when the power source circuit 3 is in the operation state, it is discriminated whether or not the activation of the power source 3 has been made on the basis of the time-up in the 1 sec timer interrupt processing during the power source OFF. If so, then the flag data is cleared which represents that the power source has been activated on the basis of the time-up. On the other hand, if not, since the current operation of the power source circuit 3 is the power source operation which is already provided in accordance with the instruction issued from a user, particularly nothing is made to complete the interrupt processing. On the other hand, when the power source 3 is not operated, simply the request of turning ON the power source is set to complete the interrupt processing.

Now, when the processings shown in FIGS. 8 to 10 are executed in conjunction with one another, the following operation is provided as a whole. That is, if after the power source circuit 3 was stopped in accordance with the instruction issued from a user, a fixed time period has elapsed, then the system controller 7 operates automatically the power source circuit 3 for a fixed time period. Therefore, since the battery 21 is charged with the electric charges for that fixed time period, the battery is prevented from being discharged.

Figure 11:
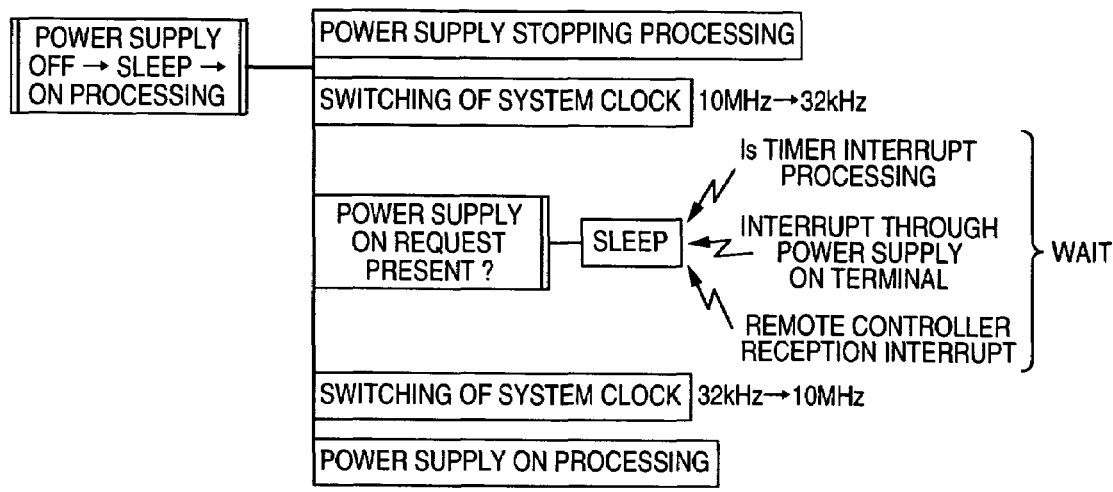
FIG. 11 is a PAD diagram useful in explaining a first to a fifth concrete examples relating to a processing of turning ON/OFF a power source in the system control block of the first embodiment.

Next, description will hereinbelow be given with respect to a second operation example of preventing the battery from being discharged with reference to FIGS. 11 to 13. First, FIG. 11 is a PAD diagram showing the processing of turning OFF the power source, and most of the operation shown therein is the same as that shown in FIG. 8. A point of difference from FIG. 8 is that the processing of clearing the power source OFF time timer data is deleted.

Figure 12:
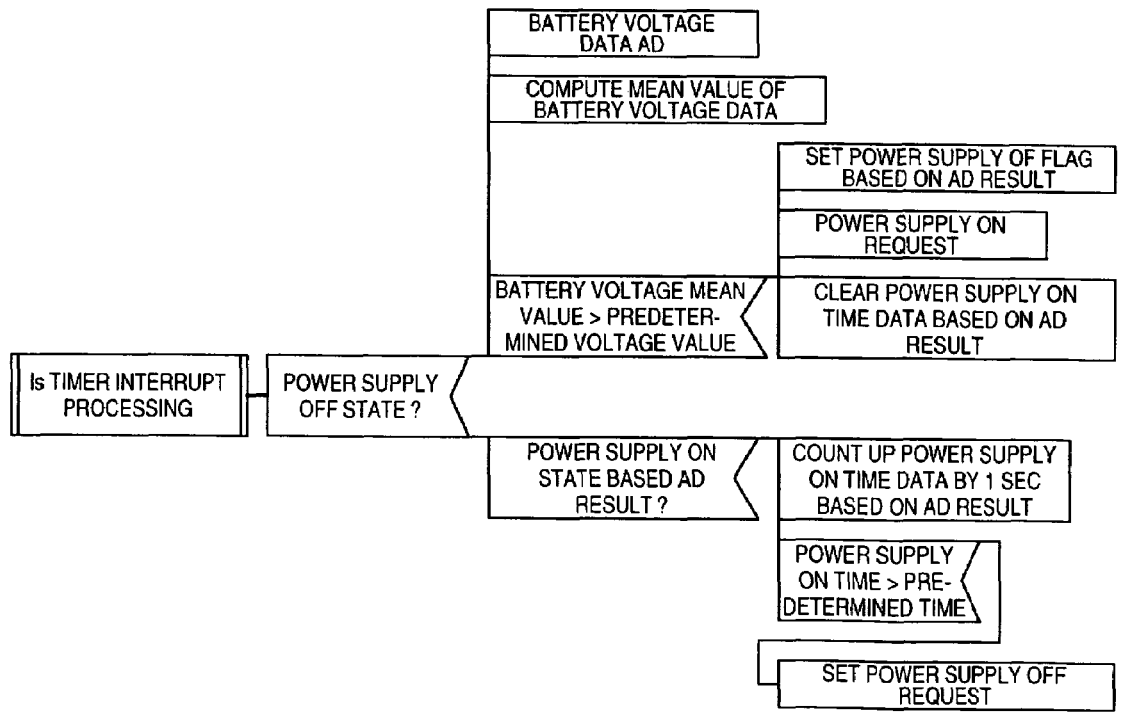
FIG. 12 is a PAD diagram useful in explaining a concrete example of a timer processing for a second concrete example of a processing of turning ON/OFF a power source in the system control block of the first embodiment.

Next, FIG. 12 is a PAD diagram showing the 1 s timer interrupt processing, and the operation thereof will hereinbelow be described. Firstly, when the power source circuit 3 is in the stop state, the system controller 7 fetches in the data relating to the voltage level of the battery 21 through the A/D converter 10. While not particularly illustrated in the figure, when the voltage level of the battery is higher than that of the power source voltage of the mocroprocessor 4, the measures of dividing suitably the voltage of the battery 21 by utilizing resistors or the like may be taken. Next, the average of the past mean voltage data and the current voltage data of the battery 21 is taken. In such a way, when the resultant mean voltage level of the battery 21 is lower than a predetermined voltage level, the request of turning ON the power source is made and also the flag data which represents that the request of turning ON the power source has been made on the basis of the detection of the over discharge level of the battery is set in the volatile area of the storage circuit 11. Then, the power source ON time timer data is cleared to complete the interrupt processing.

On the other hand, when the power source circuit 3 is in operation, it is discriminated whether or not the operation of the power source circuit 3 is carried out on the basis of the detection of the over discharge level of the battery. If so, then the power source ON time timer data is counted up by 1 sec. If that time exceeds a predetermined time, then the request of turning OFF the power source is set to complete the interrupt processing.

Figure 13:
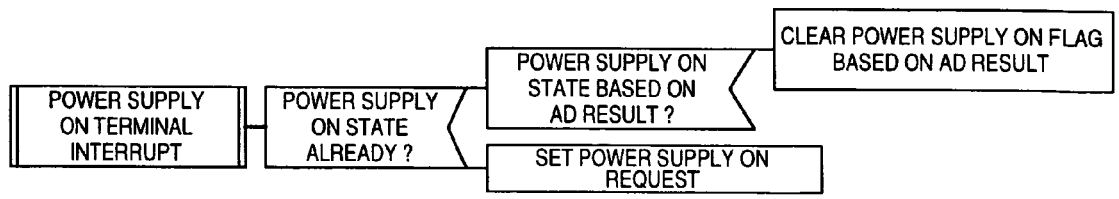
FIG. 13 is a PAD diagram useful in explaining a concrete example of a terminal interrupt processing for the second concrete example of a processing of turning ON/OFF a power source in the system control block of the first embodiment.

Next, FIG. 13 is a PAD diagram showing the processing of the interrupt generated through the power source ON terminal. When the power source circuit 3 is in the operation state, it is discriminated whether or not the activation of the power source circuit 3 was carried out on the basis of the detection of the over discharge level of the battery 21. If so, then the flag data is cleared which represents that the power source was activated on the basis of the detection of the over discharge level. On the other hand, if not, since the current operation of the power source circuit 3 is the power source operation which has already been provided in accordance with the instruction issued from a user, particularly nothing is made to complete the interrupt processing. On the other hand, when the power source circuit 3 is not operated, simply the request of turning ON the power source is made to complete the interrupt processing.

When the processings of FIGS. 11 to 13 are executed in a coordinated manner, the following operation is provided as a whole. That is, after having stopped the operation of the power source circuit 3 in accordance with the instruction issued from a user, the system controller 7 monitors the voltage level of the battery at all times. If it is judged that the voltage level of the battery has become lower than a predetermined level, then the power source circuit 3 is automatically operated for a fixed time period. Therefore, since the battery 21 is charged with the electric charge for that fixed time period, the battery is prevented from being discharged at all. By taking such measures, since the number of activating the power source circuit 3 is reduced as compared with the first method of charging automatically the battery with the electric charge, the great power saving effect is obtained. In this connection, while in the second method of charging automatically the battery 21 with the electric charges, there is adopted the method of charging the battery 21 with the electric charges for a fixed time period, similarly to the method of detecting the over discharge level, the charging operation may be completed by detecting the charge up level at which the charging operation has been completed.

Until now, as a method of preventing the battery 21 from being discharged, there has been described the method wherein in the standby state in which the power source circuit 3 is being stopped by a user, the system controller 7 activates automatically the power source circuit 3. However, in the standby state, the system controller 7 activates automatically the power source circuit 3, whereby when a user does not really use the apparatus, the operation of the power source circuit 3 is stopped without injuring the convenienceness for users so that the great power saving effect can be obtained. A concrete example thereof will hereinbelow be described in detail with reference to FIGS. 1, 7, 11 and 14 to 21.

First, in the description of FIG. 7, it was stated that in order to set the various states of the apparatus, the menu processing is prepared. The menu processing is requested by using the remocon or a switch (not shown) on the apparatus and is called within the main processing of the system controller 7. In FIG. 1, the character information which is to be superimposed on the video signal as the output is transmitted in the form of the serial data signal data to the OSD circuit 35 of the data recording/reproducing block from the system controller 7. As a result, a user views the menu displayed on the monitor which is connected to the output terminal. Then, in the case where there are the choices of the menu, the selection is carried out using the remocon.

Figure 14:
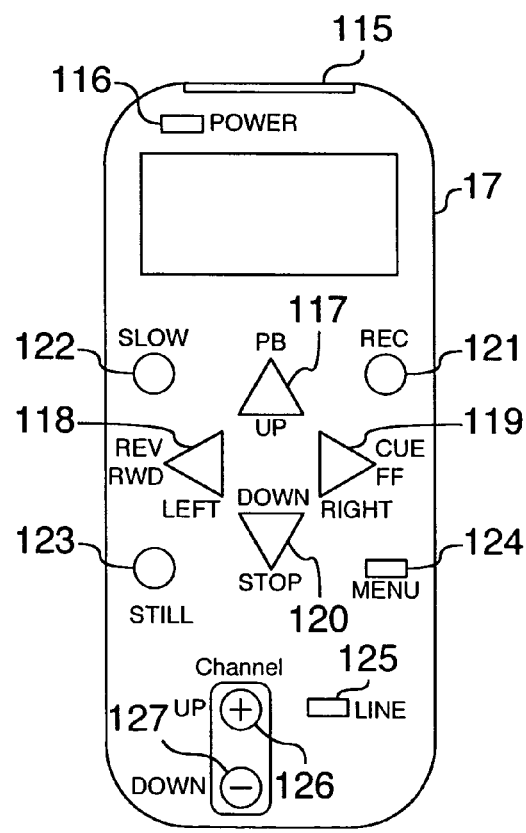
FIG. 14 is a schematic view useful in explaining a concrete example of the external appearance of a remote controller which is required for the third to fifth concrete examples of a processing of turning ON/OFF a power source in the system control block of the first embodiment.

FIG. 14 is a schematic view showing a concrete example of the remocon. First, the construction of the remocon will hereinbelow be described. In the figure, reference numeral 115 designates a transmission circuit; reference numeral 116 designates a button through which the switching of turning ON/OFF the power source is instructed; reference numeral 117 designates a button through which the reproduction is requested; reference numeral 118 designates a button through which in the case where the recording medium is the magnetic tape, the rewind reproduction or the rewind is requested, while in the case where the recording medium is the optical disc, the jump of the chapter in the return direction is requested; reference numeral 119 designates a button through which in the case of the tape, the rapid traverse reproduction or the rapid traverse is requested, while in the case of the disc, the jump of the chapter in the advancing direction is requested; reference numeral 120 designates a button through which the stop is requested; reference numeral 121 designates a button through which the recording is requested; reference numeral 122 designates a button through which the slow motion reproduction is requested; reference numeral 123, a button through which the still picture reproduction or the recording temporary stop is requested; reference numeral 124, a button through which the menu display is requested; reference numeral 125, a button through which the selection of the external signal which is supplied in the form of the recording signal through the input terminal is requested; and 126 and 127, buttons through which the switching of the channel of the reception circuit is requested. Switches (not shown) are respectively provided on the back faces of the respective buttons. Then, whenever the button is pressed down, the code signal corresponding to the request associated with the button is transmitted from the transmission circuit 115 to the remocon reception sensor 18 on the apparatus.

Now, if the menu request has been sent to the system controller 7 by pressing down the button 124, until the completion of the menu processing from now on, when the transmission codes corresponding to the four buttons 117 to 120 have been transmitted, the system controller 7 judges that the requests (top, left, right and bottom in the order of the buttons 117, 118, 119 and 120) for the movement of the cursor which is moved for the choices on the menu picture has been made.

Figure 15:
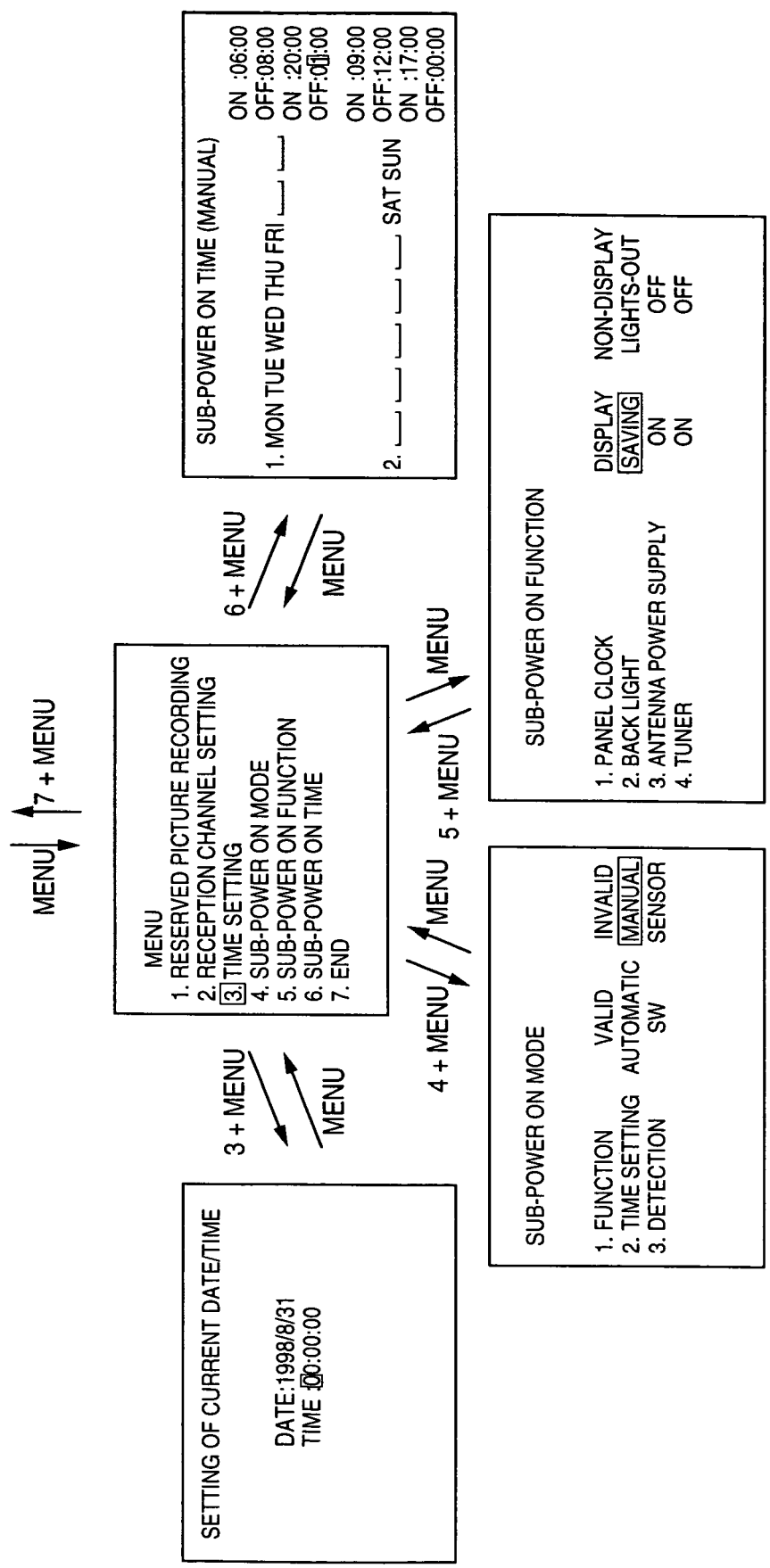
FIG. 15 is a schematic view useful in explaining a structural example of a menu picture relating to the third to fifth concrete examples of a processing of turning ON/OFF a power source in the system control block of the first embodiment.

Next, a concrete example of the menu picture will hereinbelow be described with reference to FIG. 15. First, when the menu button of the remocon is pressed down in the state in which no menu processing is executed, the list of the contents of the various settings are displayed on the monitor. In this connection, since both of the setting of the reserved picture recording time and the setting of the reception channel are not particularly related to the contents of the present invention, the description relating to the sub-menu thereof is omitted here for the sake of simplicity.

First, when the menu button is pressed down in the state in which the cursor is located at the number 3 for the time setting (the cursor is moved by pressing down the top and bottom buttons, and so forth), the sub-picture of the time setting appears. Then, the current date and time are both set. The setting of the numeric value is carried out one figure by one figure, and if the top or bottom button is pressed down, then the numeric value is increased or decreased. In addition, the setting is initially started with the year section of the date, and whenever the left or right button is pressed down, the figure is moved in the associated direction. When the menu button is pressed down, the data relating to the time which has been set is stored in the volatile storage area of the storage circuit 11 to complete the sub-menu. In this connection, the method of setting the numeric value is also applied to the following description. In addition, when the data relating to the date is stored, the system controller 7 computes automatically a day of the week using Zeller's equation or the like and then stored, in addition thereto, the data relating to a day of the week in the storage circuit 11.

Next, when in the state in which the cursor is located at the number 4 for the sub-power ON mode, the menu button is pressed down, the sub-menu of Sub-power ON Mode is displayed. The sub-power ON mode is, as described with reference to FIGS. 8 to 10 or FIGS. 11 to 13, the provisional name which is assigned to the state in which the system controller 7 operates automatically the power source circuit 3 in the state in which a user stops the power source circuit 3 to make the apparatus in the standby state. But, a point of difference from the case shown in FIGS. 8 to 10 or FIGS. 11 to 13 is that the power source circuit 3 is not operated after a lapse of the fixed time period after the power source 3 has been stopped by a user, or at a time point when the over discharge level of the battery 21 is detected, but is operated in a predetermined time zone.

In the sub-menu of the sub-power ON mode, there are the following selection items. The first selection is carried out with respect to whether or not the sub-power ON mode itself is made valid. Now, if it is selected that the sub-power ON mode itself is made invalid, then even when a user issues the instruction to stop the operation of the power source of the system, the system controller 7 never issues the instruction to stop the operation of the power source circuit 3. The second selection is carried out with respect to whether a time to stop or start the operation of the power source circuit 3 with the sub-power ON mode is set automatically or manually. In addition, the third choice is such that in the case where the automatical setting is selected for the time setting in the second choice, the detection unit thereof is selected. As for the detection unit, there are the method of storing the data relating to a time when a user starts or stops the operation of the apparatus to automatically set the time zone in which there is the possibility that a user may use the apparatus, and the method of detecting the time zone in which the human body is in room by the human body detection sensor 19 shown in FIG. 1 to automatically set the time zone in which there is the possibility that a user may use the apparatus. Thus, when the setting has been carried out which is required for the sub-menu of the sub-power ON mode, and the menu button is pressed down, the system controller 3 stores the setting contents in the volatile storage area of the storage circuit 11 to complete the sub-menu.

Next, when the menu button is pressed down in the state in which the cursor is located at the number 5 of Sub-power ON Function, the sub-menu of the choices of the various functions in the sub-power ON state appears. The first choice is carried out with respect to whether the clock display function in the display circuit 27 shown in FIG. 1 is made valid or invalid in the sub-power ON state. The second choice is carried out with respect to whether the back lights of the display circuit 27 are turned ON in the sub-power ON mode while reducing the electric power as compared with the case where the apparatus is in operation, or is turned OFF.

Figure 21:
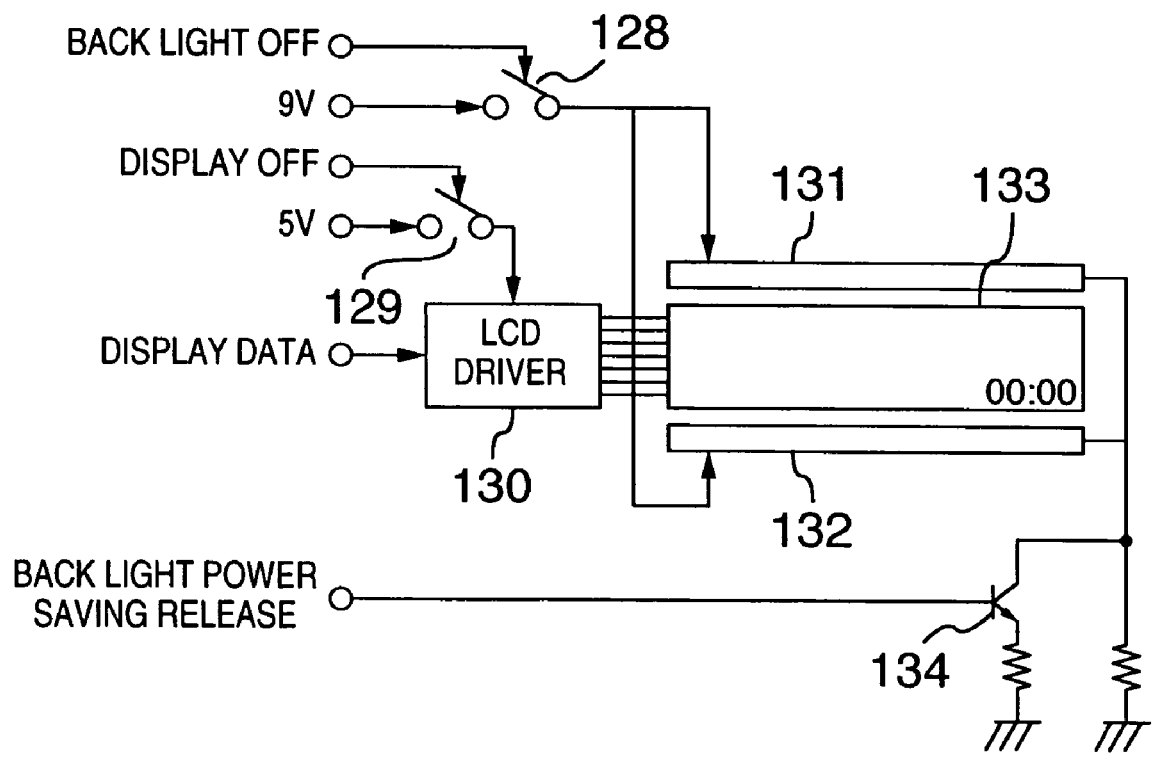
FIG. 21 is a block diagram useful in explaining a concrete example of a display circuit in the first and second embodiments according to the present invention.

In this connection, those functions are realized, in terms of a circuit, as shown in FIG. 21. FIG. 21 is a circuit diagram, partly in block diagram, showing a configuration of the display circuit 27 shown in FIG. 1, and the configuration thereof is as follows. In FIG. 21, reference numerals 128 and 129 designate respectively switches which are configured in the form of electrical circuits for interrupting/passing the two systems of D.C. electric power signals to be applied to the display circuit; reference numeral 130 designates an LCD (Liquid Crystal Display) driver for displaying the display data sent from the system controller 7 on a liquid crystal display panel 133; reference numerals 131 and 132 designate respectively back lights; and reference numeral 134 designates a switch for switching the current which is caused to flow through the back lights 131 and 132.

First, when the clock display is made invalid as the sub-power ON function, in the sub-power ON mode, the system controller 7 interrupts the supply of the electric power to the LCD driver 130 by closing the switch 129. In addition, when the lights-out of the back lights is selected as the sub-power ON function, in the sub-power ON mode, the system controller 7 interrupts the D.C. electric power signal for the back lights by closing the switch 128. In addition, when the choice of turning ON the back lights is selected in the power saving state, the switch 128 is opened, while the switch 134 is closed so that the current which is caused to flow through the back lights is limited. In this connection, in the operation, the switch 134 is opened and hence the luminance energy of the back lights is increased.

Returning back to the description of the sub-menu of the sub-power ON function shown in FIG. 15 again, the third choice is carried out with respect to whether or not in the sub-power ON mode, the D.C. electric power signal is supplied to the antenna shown in FIG. 1. A collecting microphone (not shown) is mounted to the parabola antenna for receiving the signal of the broadcasting via a satellite and hence the D.C. electric power signal needs to be supplied to this microphone (the electric power is supplied in the opposite direction to the received signal by utilizing the line of the received signal from the antenna). Therefore, as shown in FIG. 1, in the case where the monitor has the circuit for receiving the broadcasting signal, and one antenna is shared between the data recording/reproducing apparatus and the monitor, one of the apparatus and the monitor needs to supply the D.C. electric power signal to the antenna. However, if the two apparatuses supply the D.C. electric power signal at the same time, then there is the possibility that the respective power source circuits may be influenced to develop-trouble. For this reason, such a configuration is adopted that only any one of the two apparatuses supplies the D.C. electric power signal to one antenna. Therefore, for example, in the case where the D.C. electric power signal is supplied from the data recording/reproducing apparatus to the antenna, even when the data of the signal from the antenna is viewed on the monitor side, the power source circuit of the data recording/reproducing apparatus needs to be operated. However, it is uneconomical that the power source circuit of the data recording/reproducing apparatus is operated at all times in order to fulfill that requirement. Then, the D.C. electric power signal is supplied to the antenna only in the above-mentioned sub-power ON mode, whereby the power saving can be realized without injuring the conveniencenss for users.

Returning back to the description of the sub-menu of the sub-power ON function shown in FIG. 15 again, the fourth choice is carried out with respect to whether or not in the sub-power ON mode, the D.C. electric power signal is supplied to the reception circuit 38 shown in FIG. 1. In the recent digital broadcasting, there is adopted the method wherein the contract information with a viewer is transmitted together with the broadcasting signal. The viewing enable code for the channels or the programs which were purchased by a user is contained in that information. Therefore, a viewer needs to receive that enable code prior to the viewing of any of the programs. For this reason, while the reception circuit needs to be supplied with the electric power in order to receive that enable code, in this case, the electric power will be supplied thereto even in the time zone in which a user does not view any of programs. This is uncomnomical. Then, in the above-mentioned sub-power ON mode, the supply of the electric power to the reception circuit is enabled only in the time zone in which there is the possibility that a user views the broadcasting, whereby the power saving can be realized without injuring the conveniencenss for users.

When the setting has been carried out which is necessary for the sub-menu of the sub-power ON function, and the menu button is pressed down, the system controller 7 stores the setting contents in the volatile storage area of the storage circuit 11 to complete the sub-menu. Next, when the menu button is pressed down in the state in which the cursor is located at the number 6 of Sub-power ON Time, the setting sub-menu of the sub-power ON time is displayed. Only in the case where the choice of the time setting of the sub-menu of the sub-power ON mode is set manually, the setting of the menu can be changed. First, the setting is started with the classification of days of the week into weekdays and holidays. The classification of the setting 1 corresponds to weekdays and the classification of the setting 2 corresponds to holidays. The cursor is located at the section of days of the week of the setting 1 or 2 by pressing down the left and right buttons, and then the top and bottom buttons are pressed down, thereby classifying the change of the setting. Then, if the right button is further pressed down with the section of Sunday selected, then the cursor is moved to the setting area of a time. The setting area of a time is started with the hour setting in the morning, and the left and right buttons are pressed down to move the figure. For the hour setting on weekdays as well as holidays, at least two time zones (i.e., the setting mainly for the time zone from the early morning to the morning, and the setting for the time zone from the afternoon to the midnight) can be set. In addition, ON and OFF which are displayed on the left side of the hour section mean the hour when the sub-power ON mode is started and the hour when the sub-power ON mode is completed, respectively.

When the menu button is pressed down at the stage when the setting necessary for the sub-power ON time has been completed, the system controller 7 stores the data relating to the setting in the volatile storage area of the storage circuit 11 to complete the sub-menu. The above description has been given with respect to the operation of the sub-power ON mode and the method of setting the same.

Next, description will hereinbelow be given with respect to how the system controller 7 controls the power source circuit 3 and the battery 21 using the functions which have been set. First, the reset start and the main processing of the system controller 7 are the same as the operation which was described with reference to FIG. 7. In addition, the processing of turning OFF the power source, the processing of the sleep and the processing of turning ON the power source are the same as the operation which was described with reference to FIG. 11. Thus, only the is timer interrupt processing and the processing of the interrupt made through the power source ON terminal (or the processing of the interrupt of the request of turning ON the power source made through the remocon) are different therefrom. An example of the operation of these two interrupt processings will hereinbelow be described with reference to FIGS. 16 to 20.

Figure 16:
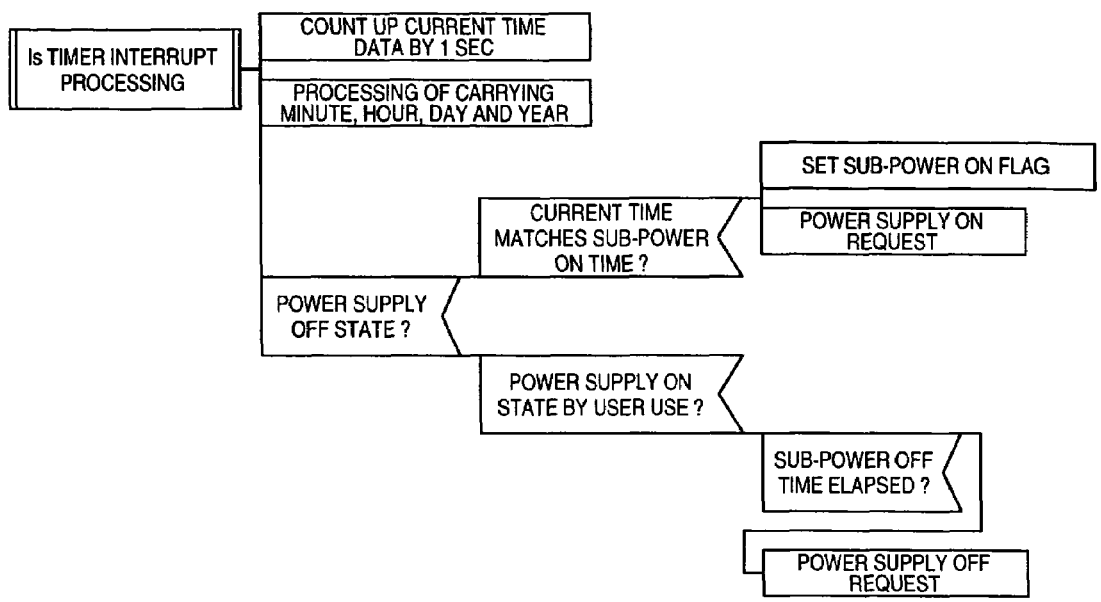
FIG. 16 is a PAD diagram useful in explaining a concrete example of a timer processing for the third and fourth concrete examples of a processing of turning ON/OFF a power source in the system control block of the first embodiment.
Figure 17:
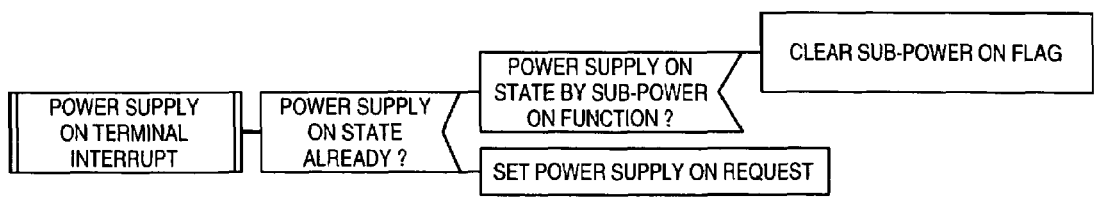
FIG. 17 is a PAD diagram useful in explaining a concrete example of a terminal interrupt processing for the third concrete example of a processing of turning ON/OFF a power source in the system control block of the first embodiment.

In the case where the time when the sub-power ON mode is started/stopped is manually set, the 1 s timer interrupt processing and the processing of the interrupt made through the power source ON terminal are respectively shown in FIGS. 16 and 17. First, in the is timer interrupt processing, the current time the data of which is stored in a predetermined location of the storage circuit 11 is counted up by 1 sec. Next, if necessary, the processing of carrying a minute, an hour, a day (including a day of the week), and a year is executed. Then, in the case where the operation of the power source circuit 3 is stopped, if the time to start the sub-power ON the data of which is stored in a predetermined location of the storage circuit matches the current time, then the flag data meaning that the power source circuit 3 has been activated by the sub-power ON function is set in the volatile area of the storage circuit 11, and also the setting of requesting the activation of the power source circuit 3 is carried out.

On the other hand, in the case where the power source circuit 3 is in operation, it is first descriminated whether the power source circuit 3 is operated by the sub-power ON function or in accordance with the operation instruction issued from a user. If it is discriminated that the power source circuit 3 is operated by the sub-power ON function, then the stop time of the sub-power ON function the data of which is stored in a predetermined location of the storage circuit 11 is compared with the current time. If it is judged that the stop time matches the current time, then the request of turning OFF the power source is made to complete the interrupt processing.

Next, in the processing of the interrupt generated through the power source ON terminal (or in the processing of the interrupt for the request of turning ON the power source which interrupt has been generated through the remocon), it is first discriminated whether or not the power source circuit 3 has already been operated. When it is discriminated that the power source circuit 3 has already been operated, if that operation is provided by the sub-power ON function, then the data flag is cleared which represents that effect and which is stored in the storage circuit 11. On the other hand, if it is discriminated that the power source circuit 3 is not yet operated, simply, the request of activating the power source circuit 3 is made to complete the interrupt processing. The foregoing is the example of the operation in the is timer interrupt processing and the processing of the interrupt generated through the power source ON terminal in the case where the time to start/complete the operation of the sub-power ON function is already set.

Figure 18:
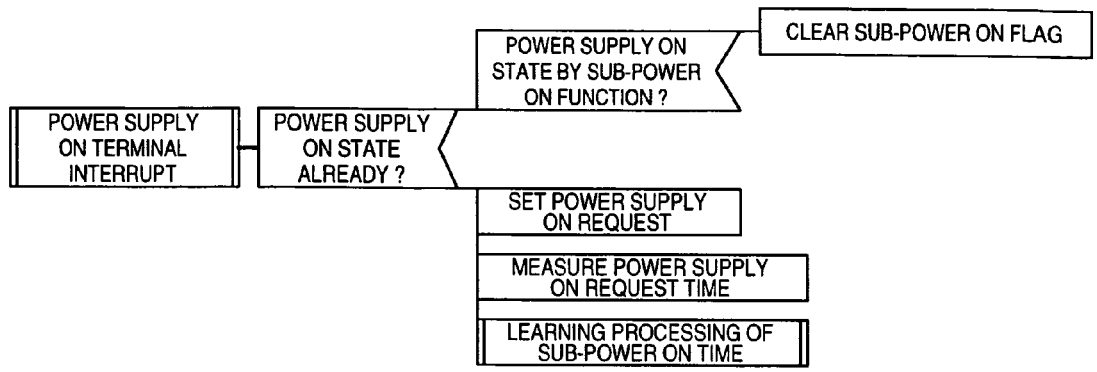
FIG. 18 is a PAD diagram useful in explaining a concrete example of a terminal interrupt processing for the fourth and fifth concrete examples of a processing of turning ON/OFF a power source in the system control block of the first embodiment.

Next, description will hereinbelow be given with respect to an example of the operation in the case where the time to start/stop the operation of the sub-power ON function is estimated from the time to turn ON or OFF the power source. In this case, the is timer interrupt processing may be the same as that shown in FIG. 16, but the processing of the interrupt generated through the power source ON terminal (or the processing of the interrupt for the request of turning ON the power source which interrupt is generated through the remocon) is changed as shown in FIG. 18.

First, when the power source circuit 3 is already in the operation state, if this operation is provided by the sub-power ON function, then the data flag is cleared which represents that effect and which has been stored in the storage circuit 11 until now. Up to this point, the processing is the same as that in the case where the time to start/stop the operation of the sub-power ON function is manually set.

Figure 19:
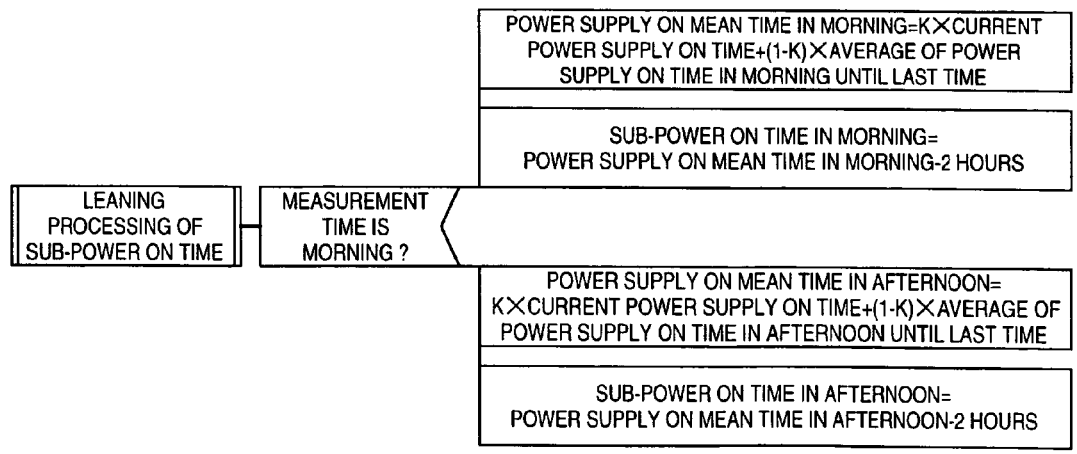
FIG. 19 is a PAD diagram useful in explaining a concrete example of a processing of learning a time when a power source is turned ON/OFF in the fourth and fifth concrete examples of a processing of turning ON/OFF a power source in the system control block of the first embodiment.
Figure 20:
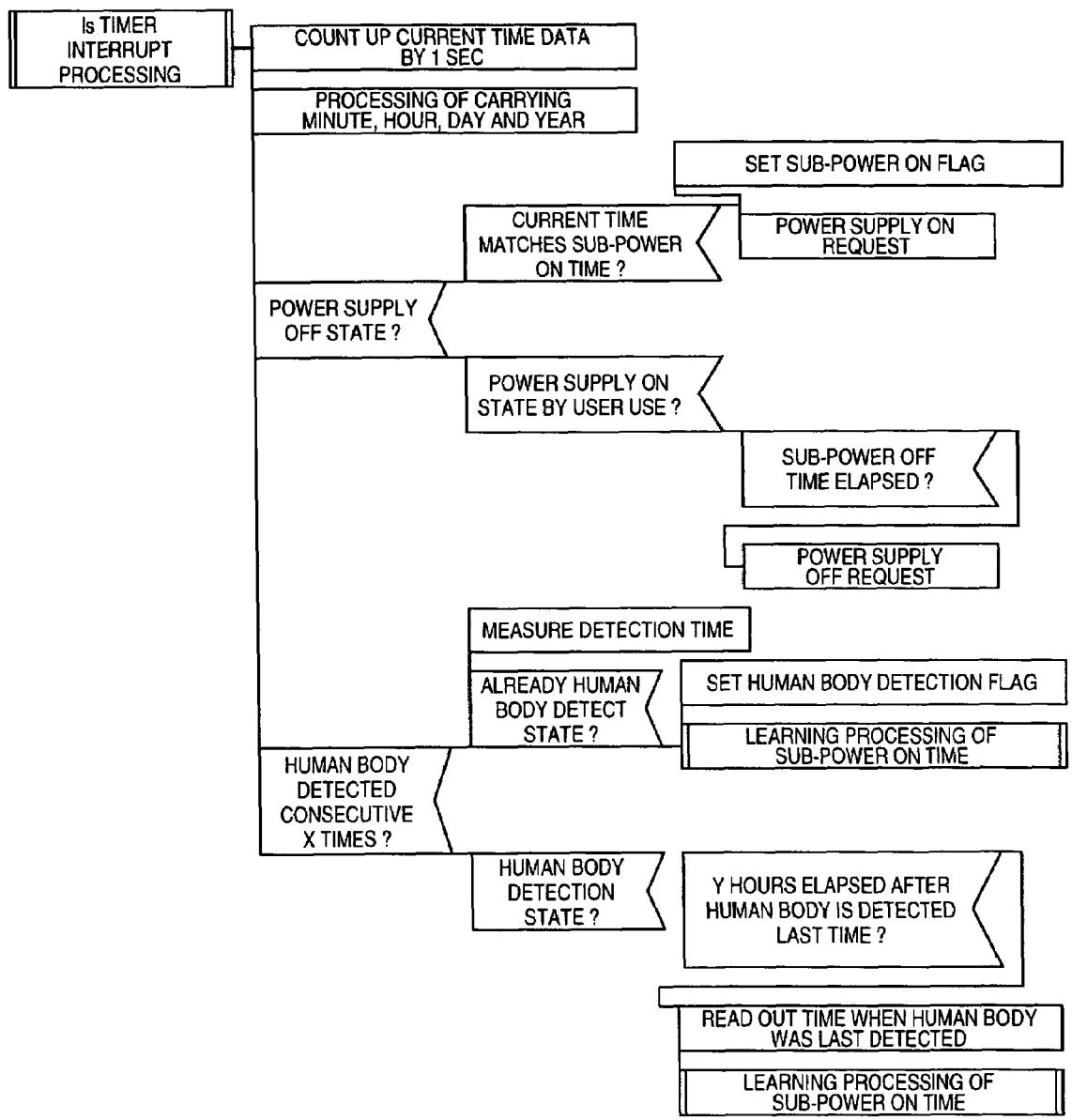
FIG. 20 is a PAD diagram useful in explaining a concrete example of a timer processing for the fifth concrete example of a processing of turning ON/OFF a power source in the system control block of the first embodiment.

On the other hand, when the power source circuit 3 is in the stop state, after having made the request of turning ON the power source, the data relating to the current time which is suitably updated on the basis of the 1 s timer interrupt processing (i.e., the time when the request of turning ON the power source is made from a user) is read out from the predetermined location of the storage circuit 11. Then, the learning processing for the time to turn ON the power source shown in FIG. 19 is executed, and then the data relating to the resultant time is stored as the time to start the operation of the sub-power ON function in a predetermined location in the volatile area of the storage circuit 11.

The learning processing for the time to start the operation of the sub-power ON function is, for example, executed as follows. First, in the case where the time when the request of turning ON the power source was made is the morning, the current time (it is assumed to become the numeric value information which is expressed by the standardized time unit such as a second or a minute) is multiplied by a certain coefficient k (0<k<1). Then, the resultant numeric data is added to the numeric data which is obtained by multiplying the mean power source ON time in the morning until the last time (it is similarly assumed to become the numeric value data which is expressed by the standardized time unit and which is stored in a predetermined location in the storage circuit 11) by (1−k), and the resultant numeric value data is stored as a new mean power source ON time in a predetermined volatile area in the storage circuit 11. By taking such measures, it is possible to grasp the mean power source ON time of a user. Therefore, since the time zone ranging from about two hours, for example, before that time is estimated as the time zone in which the possibility that a user uses the apparatus is high (conversely, when the time to turn OFF the power source by the sub-power OFF function is estimated from the time to turn OFF the power source, the time zone ranging up to about two hours, for example, after the mean power source OFF time is made the time zone in which the possibility that a user uses the apparatus is high), the time data of interest may be stored as the time to start the operation of the sub-power function in a predetermined volatile area of the storage circuit 11. In this connection, the learning of the time to turn ON the power source in the afternoon and the setting of the time to start the operation of the sub-power ON function are both similarly carried out. In addition, in order to cope with the situation, such as the time zone right after the reset start, in which the mean time for turning ON the power source until the last time is not yet computed, the default mean time for turning ON the power source may be set in the reset start processing. The foregoing is the example of the operation in the case where the time zone in which the possibility that a user uses the apparatus is high is estimated from the time when a user issues the instruction to turn OFF the power source to set automatically the time to start/stop the operation of the sub-power ON function.

Next, description will hereinbelow be given with respect to the method of estimating the time zone, in which the possibility that a user uses the apparatus is high, by utilizing the human body sensor. The processing of estimating the time by utilizing the human body sensor is basically executed in the 1 s timer interrupt processing. Therefore, the processing of the interrupt for the request of turning ON the power source which interrupt is generated through the terminal (or the romocon) may be the same as that shown in FIG. 17. Description will hereinbelow be given with respect to an example of the operation of the 1 s timer interrupt processing with reference to FIG. 20. But, since the contents of the first half thereof are the same as those which were described with reference to FIG. 16, description will hereinbelow be given with respect to only the operation of the second half which is added to the operation shown in FIG. 16.

First, it is discriminated whether or not the human body is continuously detected the predetermined number of times (in this case, it is mentioned as X times) by the human body sensor. This prevents the malfunction for the sensor due to the chattering which is generated by the noises or the like. If it is discriminated that the human body is continuously detected equal to or more than the presetermined number of times, then the data relating to the detection time is stored in a predetermined location of the storage circuit 11. If the state is provided in which the human body has already been detected, then nothing is made to complete the processing. Conversely, if the state is provided in which the human body has not been detected yet, then the data flag meaning that the processing has entered into the human body detection state is stored in a predetermined location of the storage circuit 11, and at the human body detection time which is formerly measured, the learning processing of the sub-power ON time is called. The learning processing of the sub-power ON time can be realized with the same processing as that described formerly with reference to FIG. 19, and hence the time to turn ON the power source shown in FIG. 19 is replaced with the human body detection time in order to execute the associated processing.

Next, when the human body sensor does not detect a human body any longer, if it is not that the state of detecting the human body has already occurred, then nothing is made to complete the processing. On the other hand, when the state of detecting the human body is being provided, if a predetermined time (in this case, it is mentioned as Y hours) has elapsed after the human body was detected last time, the data relating to the time when the human body is last detected must be left in the predetermined location of the the storage circuit 11. Therefore, this time data is read out to call the learning processing of the sub-power ON time so that the time to stop the operation of the sub-power ON function is set. Then, in order that the fact that the human body detection state has been completed may be represented, the data flag representing that the processing has entered into the human body detection state is cleared. As a result, the operation of setting automatically the sub-power ON time when the human body detection sensor is utilized.

From the above-mentioned operation, it is possible to discriminate automatically between the case where when the data recording/reproducing apparatus is in the standby state, the possibility that a user uses the apparatus is low and the case where when the data recording/reproducing apparatus is in the standby state, the possibility that a user uses the apparatus is high. Thus, on the basis of the discrimination result, in the time zone in which the possibility that a user uses the apparatus is low, the apparatus is judged to be in the standby state, so that only the necessary minimum circuits are operated by the battery 21 to enhance the power saving effect, while in the time zone in which the possibility that a user uses the apparatus is high, the power source circuit 3 is operated, thereby being able to prevent the convenienceness for users from being injured.

Next, a second embodiment of the present invention will hereinafter be described in detail. In the description made until now, the description has been given with respect to the method of using the power source circuit 3 and the battery 21 appropriately in order that in the standby state of the apparatus, the convenienceness for users may be made compatible with the power saving effect. In this connection, it has been mentioned that as one of the causes in which the power saving effect becomes insufficient when the standby state is continued with the power source circuit 3 operated, the efficiency of the power source circuit itself is reduced. Then, the power source circuit 3 is given the mode of generating the D.C. electric power signal for the light load and the mode of generating the D.C. electric power signal for the heavy load, whereby the power saving effect can be enhanced without injuring the convenienceness for users in the standby state. The configuration and the operation of these data recording/reproducing apparatus and power source circuit will hereinbelow be described in detail with reference to FIGS. 22 and 23.

Figure 22:
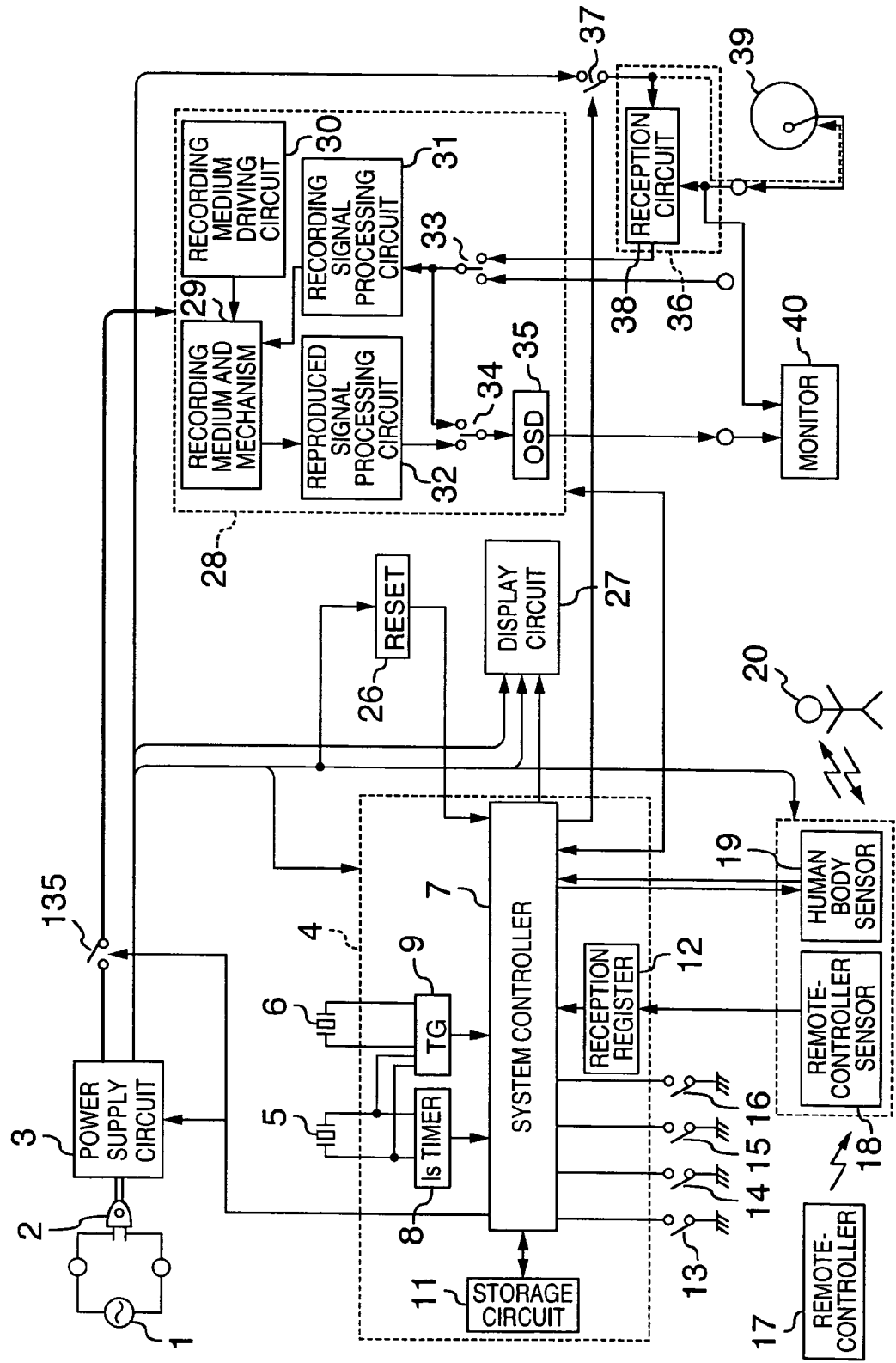
FIG. 22 is a block diagram useful in explaining the overall configuration of the second embodiment according to the present invention.

Firstly, FIG. 22 is a block diagram, partly in circuit diagram, showing a configuration of the overall data recording/reproducing apparatus. The configuration thereof is practically the same as that shown in FIG. 1. Points of difference are that both of the battery and the circuit system for switching the D.C. electric power signals relating thereto are removed, and that an electrical switching group 135 are inserted into the line of the D.C. electric power signal group supplied to the data recording/reproducing block (in the description as well made until now, it was mentioned in the description of FIG. 2 that if necessary, such a switching group may be inserted).

Figure 23:
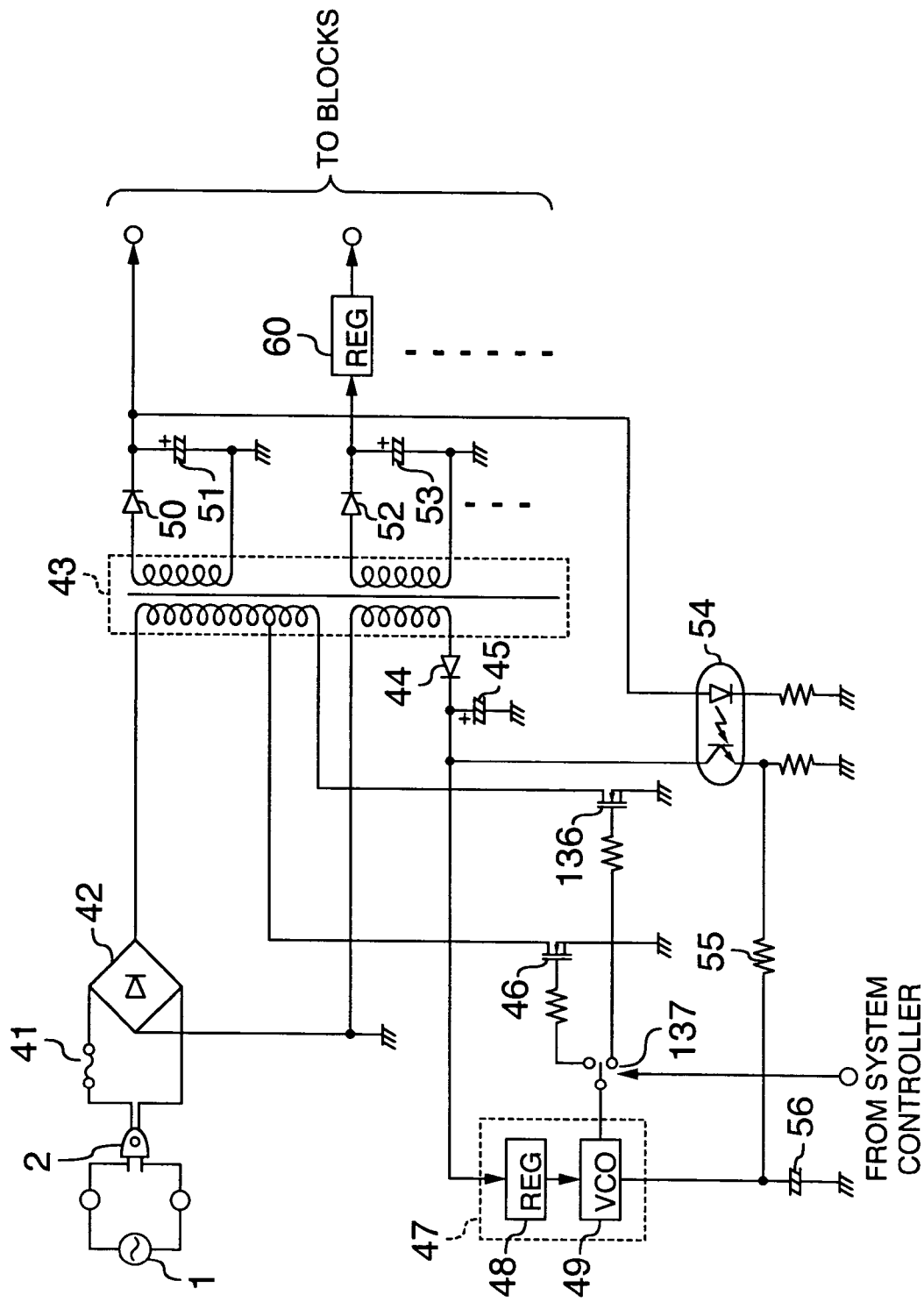
FIG. 23 is a circuit diagram useful in explaining a concrete example of a power source circuit in the second embodiment according to the present invention.

On the other hand, FIG. 23 is a circuit diagram showing a concrete example of a configuration of the power source circuit 3 shown in FIG. 22. The configuration thereof is practically the same as that shown in FIG. 2. Points of difference are that two switching devices 46 and 136 for switching the primary side signals of the transformer are provided, a plurality of taps are provided in the primary coil and the two switching devices 46 and 136 are respectively connected to the taps, and that which switching device the voltage controlled oscillator 49 switches is switched by the system controller 7 (in some case, such a configuration may be adopted that the two systems of voltage controlled oscillators 49 are prepared, and which system of voltage controlled oscillator 49 is operated is switched by the system controller 7).

In this connection, the number of turns of the primary winding of the transformer associated with the switching device 136 is made larger than that of the primary winding of the transformer associated with the switching device 46. In this case, the voltage swing level on the secondary side when employing the switching device 136 becomes lower than that when employing the switching device 46.

This means the following effect. When the circuit group for the light load is intended to be operated by utilizing the switching device 46, this can be realized by making short the time period required to cause the primary winding conduct and by making long the nonconduction time period. However, when the load applied to the circuit to be driven is extremely different between the case of the heavy load and the case of the light load (e.g., equal to or larger than 10 times), and it is assumed that the circuit to be driven is surely operated in the case of the heavy load, the operation in the light load is as follows. That is, the operation range of the transformer becomes lower than the range in which the electric power is properly transferred with the current change which is continuous from the primary side to the secondary side, and hence the transfer of the electric power is carried out with the current change which is discontinuous from the primary side to the secondary side. As a result, the state in which no current is temporarily caused to flow is present in the standby winding side of the transformer, this results in that the smoothing circuit becomes to be able to obtain the D.C. electric power signal at a desired voltage level even in the light load.

However, in this case, of the currents which have been caused to flow through the primary winding of the transformer, a part of the currents which has not been transferred to the secondary side is simply caused to flow through the resistance component of the primary coil and hence is all consumed uselessly. This state is the so-called the state in which the efficiency of the power source circuit is reduced. Then, as has already been described, the switching device 136 associated with the primary winding the number of turns of which is large is switched. As a result, since the ratio of the transformation for the secondary side is high, the electric power can be transferred to the secondary side without changing extremely the ratio of the conduction time period to the nonconduction time period of the switching device (i.e., with the continuous current change).

This thought might lead one to think that if the switching device 136 side is always used, then the electric power transfer with a high efficiency can always be carried out. However, since the amount of primary winding is increased, the resistance component thereof is also increased correspondingly, which is disadvantageous when driving the heavy load. In view of such, the switching device 46 side is used when driving the heavy load, while the switching device 136 side is used when driving the light load, whereby the D.C. electric power signal is generated with the highest efficiency in the heavy load as well as in the light load.

The data recording/reproducing apparatus of FIG. 22 to which the power source circuit 3 having the two operation modes as described above is applied is operated as follows. When a user issues the instruction to make the state of the apparatus proceed to the standby state using the terminal or the remocon, the system controller 7 makes the mode of the power source circuit 3 proceed to the operation mode for the light load, and also interrupts the line group through which the D.C. electric power signal is supplied to the data recording/reproducing block 28 by opening the switch group 135. On the other hand, when a user issues the instruction to make the state of the apparatus proceed to the operation state using the terminal or the romocon, the system controller 7 switches the current mode of the power source circuit 3 over to the operation mode for the heavy load, and also if necessary, starts the supply of the D.C. electric power signal to the data recording/reproducing block 28 by closing the switch group 135. As a result, since even in the standby state, the efficiency of the power source circuit 3 is not reduced at all, it is possible to enhance remarkably the power saving effect in the standby state.

In this connection, the power saving means in the liquid crystal display circuit, the reception circuit and the antenna in the standby state can be realized in such a way that similarly to the method as described in the first embodiment, whether the time zone of interest is the time zone in which the possibility that a user uses the apparatus is low in the standby state, or the time zone in which the possibility that a user uses the apparatus is high therein is clearly or automatically set to control the current supply/current interrupt or the electric power to the circuits in accordance with the respective time zones.

Finally, the efficiency of the power source circuit based on the switching apparatus is greatly improved by preparing the transformer corresponding to the load of interest as described above. However, since the resistance component is necessarily present in the winding of the transformer, the eddy current loss is generated in the magnetic circuit of the transformer, and so forth, the efficiency of the power source circuit does not reach 100%.

Therefore the power source circuit shown in FIG. 3 which is adapted in the configuration to have two switching devices as in the power source circuit shown in FIG. 23 is applied to the data recording/reproducing apparatus shown in FIG. 1. Then, the following operation is carried out by adopting this configuration. That is, in the time zone in which the apparatus is in the standby state and the possibility that a user uses the apparatus is low, the electric power is supplied to the necessary portions of the apparatus by the battery 21. In addition, in the time zone in which the apparatus is in the standby state, and the possibility that a user uses the apparatus is high, the power source circuit 3 is operated in the operation mode for the light load to supply the electric power to the necessary circuits. Also, when the apparatus is in the operation state, the power source circuit 3 is operated in the operation mode for the heavy load to supply the electric power to each of the circuits. In accordance with this configuration and the operation, there is obtained the effect that the electric power in the standby state can be more efficiently reduced without injuring the convenienceness for users.

As set forth hereinabove, according to the present invention, the following effects can be obtained.

In the standby state in which a user issues the instruction to stop the operation of the power source circuit of the apparatus, the means for generating the electrical power signal is switched from the switching power source circuit over to the battery. Therefore, since the switching power source circuit the operation of which is non-efficient for the light load can be stopped, the power consumption in the standby state can be improved. On the other hand, the switching power source is automatically activated whenever a fixed time period has elapsed or whenever it has become a fixed time to charge the battery with the electric charges. Therefore, a user does not need to exchange the old battery for new one as long as the charging/discharging ability of the battery is not lost, and hence there is provided the effect that the convenienceness which is substantially the same as that in the conventional apparatus can be ensured.

In addition, according to the present invention, the time zone in which a user uses the apparatus or whether a user is present or absent is clearly set or automatically detected, whereby the time zone in which a user does not really uses the apparatus can be distinguished from the time zone in which there is the possibility that a user uses the apparatus. As a result, in the time zone in which a user does not really use the apparatus, the state of the apparatus is made proceed to the state in which the electric power is hardly consumed. On the other hand, in the time zone in which there is the possibility that a user uses the apparatus, the supply of the electric power to the antenna requiring the electric power, the supply of the electric power to the reception circuit for receiving the contract information, and the supply of the electric power to each of the functions, such as the time display, which may be utilized even when a user has issued the instruction to stop the operation of the power source of the apparatus are carried out while maintaining the power consumption minimum. As a result, the generation of the electric power signal which is optimal for each of the time zone in which a user does not really use the apparatus, the time zone in which there is the possibility that a user uses the apparatus, and the time zone in which a user is using the apparatus can be carried out. Therefore, there is obtained the effect that the efficient reduction of the power consumption can be realized without injuring the convenienceness for users.

The invention may be embodied in other specific forms without departing from the spirit or essential characteristics thereof. The above embodiments are therefore to be considered in all respects as illustrative and not restrictive, the scope of the invention being indicated by the appended claims rather than by the foregoing description and all changes which come within the meaning and range of equivalency of the claims are therefor intended to be embraced therein.

What is claimed is:

1. A signal recording/reproducing apparatus including a first power source unit which generates necessary electric power signals from a commercial power source, a second power source unit which generates a necessary electric power signal from a battery, a recording signal processing unit, and a reproduced signal processing unit; said apparatus comprising:

a time measuring instrument which is supplied with the electric power from said second power source unit; and a charging unit which charges said battery with the electric charges;

wherein whenever said time measuring instrument measures a predetermined time, the generation of the electric power signals from said first power source unit is started, and said battery is charged with the electric charges by said charging unit.

2. A signal recording/reproducing apparatus including a first power source unit which generates necessary electric power signals from a commercial power source, a second power source unit which generates a necessary electric power signal from a battery, a recording signal processing unit, and a reproduced signal processing unit; said apparatus comprising:

a time measuring instrument which is supplied with the electric power from said second power source unit;

a detection unit which detects the output voltage level of said battery; and a charging unit which charges said battery with the electric charges;

wherein whenever said time measuring instrument measures a predetermined time, the output voltage level of said battery is detected by said detection unit, and when the detected level is equal to or smaller than a predetermined value, if necessary, the generation of the electric power signals from said first power source unit is started and said battery is charged with the electric charges by said charging unit.

3. A signal recording/reproducing apparatus including a first power source unit which generates necessary electric power signals from a commercial power source, a second power source unit which generates a necessary electric power signal from a battery, a recording signal processing unit, and a reproduced signal processing unit; said apparatus comprising:
 a time measuring instrument; and
 a time storing unit which stores therein data relating to a predetermined time;
 wherein both of said time measuring instrument and said time storing unit are supplied with the electric power from said second power source unit; and
 wherein the start and stop of the generation of the electric power signals from said first power source unit are switched over to each other at the stored time.

4. A signal recording/reproducing apparatus including a first power source unit which generates necessary electric power signals from a commercial power source, a second power source unit which generates a necessary electric power signal from a battery, a recording signal processing unit, and a reproduced signal processing unit; said apparatus comprising:
 a detector supplied with the electric power from said second power source unit for detecting the presence of a human body;
 wherein when the presence of the human body is detected, the generation of the electric power signals from said first power source unit is started, while when the presence of the human body is not detected, the generation of the electric power signals from said first power source unit is stopped.

* * * * *